(12) United States Patent
Melloni et al.

(10) Patent No.: US 7,324,267 B2
(45) Date of Patent: Jan. 29, 2008

(54) FOUR-WAVE-MIXING BASED OPTICAL WAVELENGTH CONVERTER DEVICE

(75) Inventors: Andrea Melloni, Milan (IT); Francesco Morichetti, Novara (IT); Silvia Maria Pietralunga, Cassina de Pecchi (IT); Mario Martinelli, San Donato Milanese (IT)

(73) Assignee: Pirelli & C. S.p.A., Milan (IT)

( * ) Notice: Subject to any disclaimer, the term of this patent is extended or adjusted under 35 U.S.C. 154(b) by 74 days.

(21) Appl. No.: 10/518,855

(22) PCT Filed: Jun. 28, 2002

(86) PCT No.: PCT/EP02/07207

§ 371 (c)(1),
(2), (4) Date: Sep. 14, 2005

(87) PCT Pub. No.: WO2004/003653

PCT Pub. Date: Jan. 8, 2004

(65) Prior Publication Data

US 2006/0092500 A1    May 4, 2006

(51) Int. Cl.
G02F 1/35 (2006.01)
G02F 2/02 (2006.01)

(52) U.S. Cl. ...................... 359/330; 359/326
(58) Field of Classification Search ......... 359/325–332
See application file for complete search history.

(56) References Cited

U.S. PATENT DOCUMENTS 5,243,610 A    9/1993  Murata
5,311,605 A    5/1994  Stewart (Continued)

FOREIGN PATENT DOCUMENTS

EP    0 730 191 A2    9/1996

(Continued)

OTHER PUBLICATIONS

P.P. Absil et al., "Wavelength Conversion in GaAs Micro-Ring Resonators", Optics Letters, vol. 25, No. 8, pp. 554-556, (Apr. 15, 2000).

(Continued)

*Primary Examiner*—Michelle Connelly-Cushwa
*Assistant Examiner*—Rhonda S. Peace
(74) *Attorney, Agent, or Firm*—Finnegan, Henderson, Farabow, Garrett & Dunner, L.L.P.

(57) ABSTRACT

A wavelength converter device is provided for generating a converted radiation at frequency $\omega_g$ through interaction between at least one signal radiation at frequency $\omega_s$ and at least one pump radiation at frequency $\omega_p$, including an input for the at least one signal radiation at frequency $\omega_s$, a pump light source for generating the at least one pump radiation at frequency $\omega_p$, an output for taking out the converted radiation at frequency $\omega_g$, a structure for transmitting the signal radiation, including two optical resonators having a non-linear material, having an optical length of at least $40*\lambda/2$, $\lambda$ being the wavelength of the pump radiation, and resonating at the pump, signal and converted frequencies $\omega_p$, $\omega_s$ and $\omega_g$, wherein by propagating through the structure, the pump and signal radiation generate the converted radiation by non-linear interaction within the optical resonators.

32 Claims, 18 Drawing Sheets

U.S. PATENT DOCUMENTS

| | | | |
|---|---|---|---|
| 5,550,671 | A | 8/1996 | Simpson et al. |
| 5,696,780 | A | 12/1997 | Pieterse et al. |
| 5,808,764 | A * | 9/1998 | Frigo et al. ............... 398/72 |
| 5,854,802 | A | 12/1998 | Jin et al. |
| 6,002,522 | A | 12/1999 | Todori et al. |

FOREIGN PATENT DOCUMENTS

| | | |
|---|---|---|
| EP | 0 981 189 | 2/2000 |
| WO | WO 99/52015 | 10/1999 |

OTHER PUBLICATIONS

A. Melloni et al., "Synthesis of Direct-Coupled-Resonators Bandpass Filters for WDM Systems", Journal of Lightwave Technology, vol. 20, No. 2, pp. 296-303, (Feb. 2002).

A. Yariv et al., "Coupled-Resonator Optical Waveguide: A Proposal and Analysis", Optics Letters, vol. 24, No. 11, pp. 711-713, (Jun. 1, 1999).

R. Goto et al., "Sideband Injection Locking Using Cavity-Enhanced Highly Non-Degenerate Four-Wave Mixing in DFB-LDs", Electronics Letters, vol. 34, No. 23, pp. 2249-2250, (Nov. 12, 1998).

H. van de Stadt et al., "Multimirror Fabry-Perot Interferometers", Optical Society of America, vol. 2, No. 8, pp. 1363-1370, (Aug. 8, 1985).

S.J.B. Yoo, "Wavelength Conversion Technologies for WDM Network Applications", Journal of Lightwave Technology, vol. 14, No. 6, pp. 955-966, (Jun. 6, 1996).

Legoubin et al., "Free Spectral Range Variations of Grating-Based Fabry-Perot Filters Photowritten in Optical Fibers", Journal of Optical Society of America, vol. 12, No. 8, pp. 1687-1694, (1995).

G.P. Agrawal, "Nonlinear Fibers Optics", Academic Press, 2$^{nd}$ Edition, p. 17, (1995).

Chou et al., "Efficient Wide-Band and Tunable Midspan Spectral Inverter Using Cascaded Nonlinearities in LiNbO$_3$ Waveguides", IEEE Photonics Technology Letters, vol. 12, No. 1, pp. 82-84, (2000).

* cited by examiner

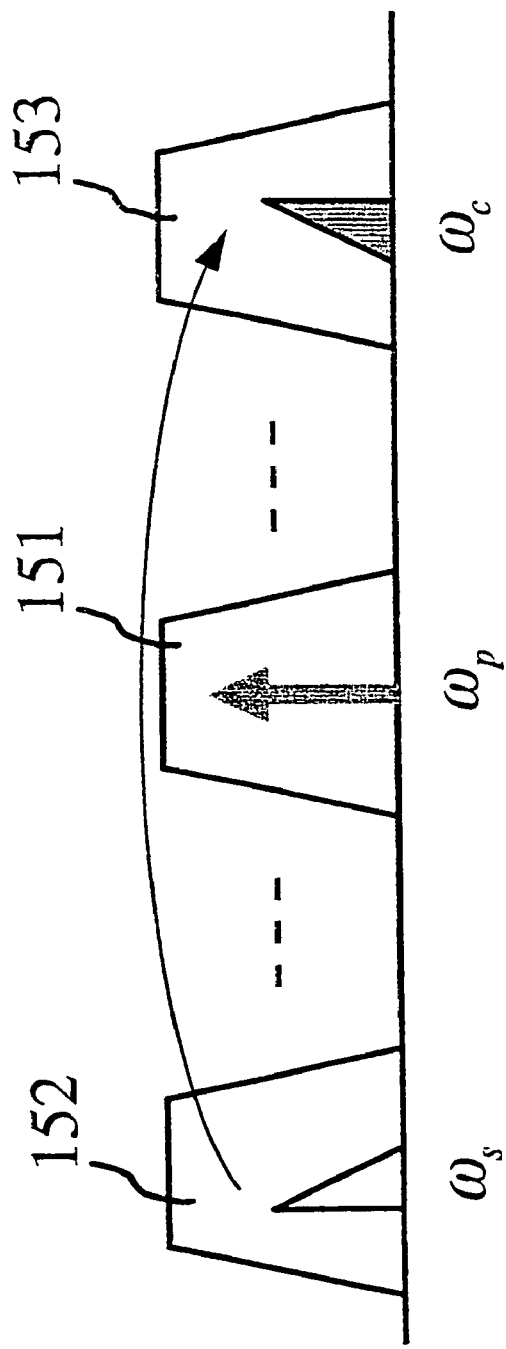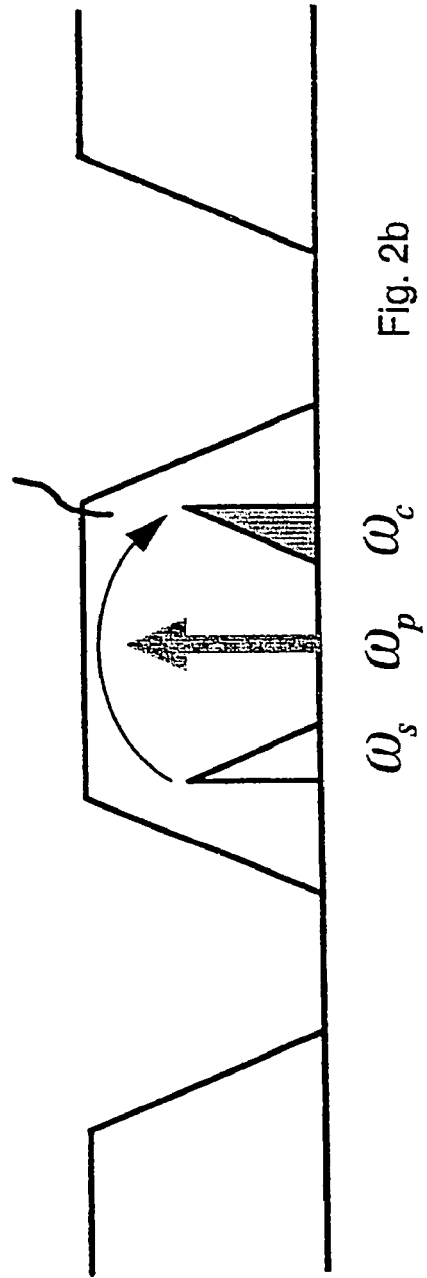
Fig. 2a
Fig. 2b

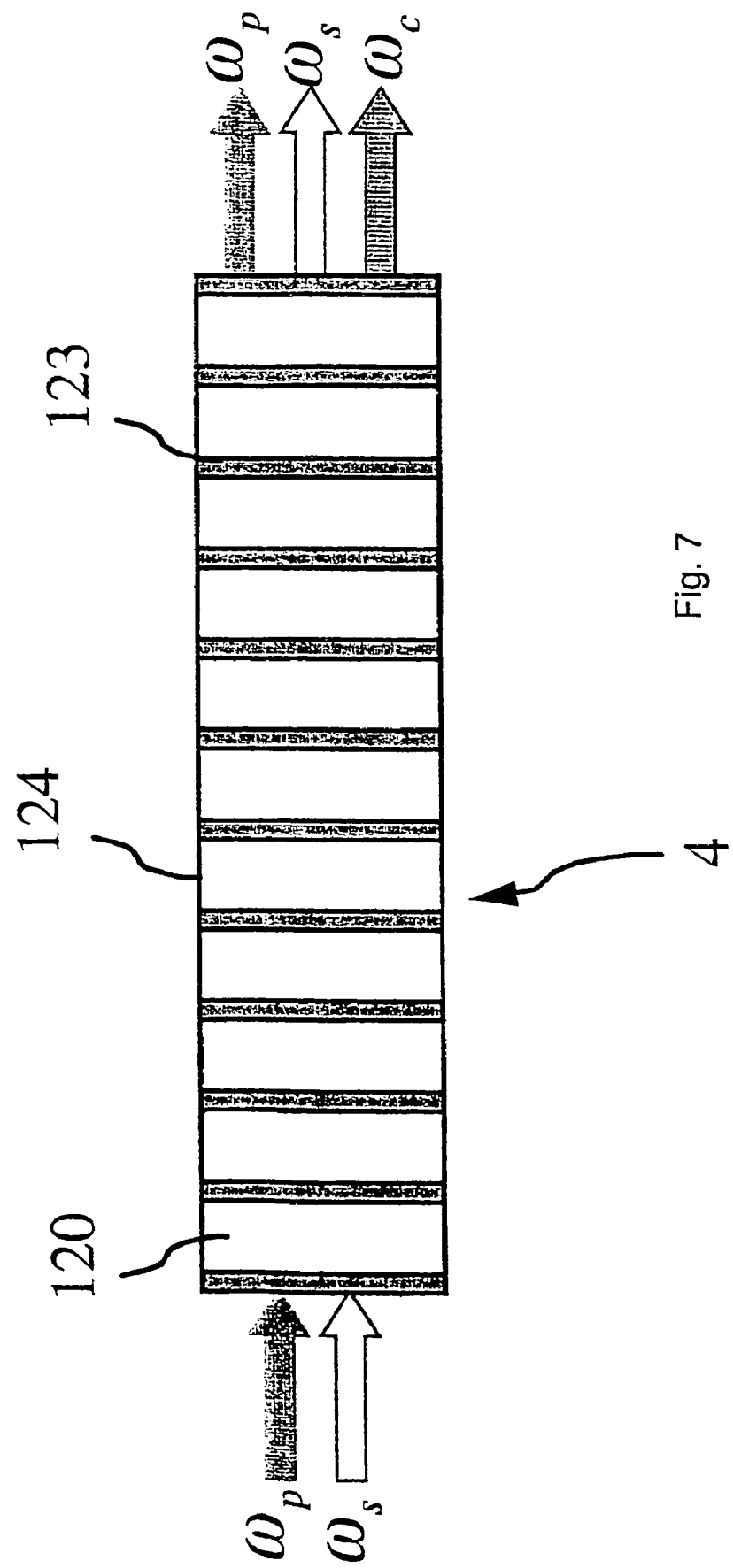

US 7,324,267 B2

FOUR-WAVE-MIXING BASED OPTICAL WAVELENGTH CONVERTER DEVICE

CROSS REFERENCE TO RELATED APPLICATION

This application is a national phase application based on PCT/EP2002/007207, filed Jun. 28, 2002, the content of which is incorporated herein by reference.

BACKGROUND OF THE INVENTION

1. Field of the Invention

The present invention relates to a wavelength converter device comprising a structure having a plurality of cascaded optical resonators.

The present invention relates, moreover, to an use of a structure comprising a plurality of cascaded optical resonators for generating a radiation at frequency $\omega_g$ through non-linear interaction between at least one pump radiation at frequency $\omega_p$ and at least one signal radiation at frequency $\omega_s$.

Furthermore, the present invention relates to an use of a structure, comprising a plurality of cascaded optical resonators made of a non-linear material, for altering the optical spectrum of at least one signal radiation at frequency $\omega_s$ by non-linear interaction within the material of the optical resonators.

Moreover, the present invention relates to an apparatus for an optical network node comprising a routing element and a wavelength converter device of the invention.

Additionally, the present invention relates to an optical communication line comprising an optical transmission path for transmitting at least one signal radiation at frequency $\omega_s$ and a wavelength converter device of the invention.

2. Description of the Related Art

Structures made of a plurality of cascaded optical resonators are known.

For example, A. Melloni et al. ("*Synthesis of direct-coupled-resonators bandpass filters for WDM systems*", Journal of Lightwave Technology, Vol. 20, No. 2, February 2002, pages 296-303) disclose a structure consisting of cascaded direct-coupled ring resonators or cascaded Fabry-Pérot resonators for use as a bandpass filter.

Furthermore, U.S. Pat. No. 5,311,605 discloses an optical device comprising a length of optical waveguide having incorporated therein an extended sequence of coupled single-resonator structures for use as an optical slow wave structure. This document states that the structure may also be designed to provide a desired filter characteristic, a dispersion such as to correct for undesirable dispersion in other components of an optical system or to provide pulse expansion or compression. The Applicant notes that no mention of use of non-linear interactions is made in this document.

In a WDM (wavelength division multiplexing) optical communication system/network, wavelength management and wavelength routing control between nodes of the system is crucial for preventing wavelength blocking and facilitating cross connecting. To this end wavelength converter devices able to shift a signal radiation from an optical channel to another are required.

Non-linear wavelength converter devices using a parametric process are known.

A parametric process is a process typical of materials having a non-linearity of the $\chi_2$ or $\chi_3$ type according to which electromagnetic radiation at predetermined frequencies that propagate in such materials interact with each other for generating electromagnetic radiation at different frequencies from those that have generated them.

For example, a parametric process is a process according to which a pump radiation at frequency $\omega_p$ that propagates in a non-linear material, interacting with a signal radiation at frequency $\omega_s$, generates a radiation at frequency $\omega_g$.

Typical parametric processes are a difference frequency generation process, according to which $\omega_g=\omega_p-\omega_s$, a sum frequency generation process, according to which $\omega_g=\omega_p+\omega_s$, a second or third harmonic generation process, according to which $\omega_g=2\omega_p$ or, respectively, $\omega_g=3\omega_p$ and a degenerate four-wave mixing (FWM) process according to which $\omega_g=2\omega_p-\omega_s$ or $\omega_g=2\omega_p+\omega_s$.

For example, one-dimensional-photonic-crystal multi-resonator structures (also called photonic band-gap structures) have been proposed for wavelength conversion through a second harmonic generation parametric process.

A one-dimensional photonic crystal structure typically consists of a periodical alternation of two layers of material having different refractive indexes. The multiple reflections at the interfaces between the two layers at different refractive index generate constructive and destructive interference between the transmitted light and the reflected light, so that the propagation of electromagnetic waves in the photonic crystal structure is allowed in some intervals of frequencies (or wavelengths) and forbidden in other intervals. The layers typically have thicknesses a and b of $\lambda/4n$ (quarter-wave layer) or $\lambda/2n$ (half-wave layer), where $\lambda$ is the operating wavelength and n the refractive index of the layer, so as to form a periodic quarter-wave, half-wave or mixed quarter-half-wave structure.

WO 99/52015 describes a second harmonic generator based on a periodic photonic crystal structure. The described structure comprises a plurality of layers of a first and a second material that periodically alternate, and has a band edge at the pump radiation frequency and a second transmission resonance near the band edge of the second order band gap at the generated second harmonic frequency. The layers have thicknesses a and b of $\lambda/4n$ or $\lambda/2n$.

U.S. Pat. No. 6,002,522 discloses a structure having materials with different refractive indexes and periodically arranged to form a photonic band-gap structure. Furthermore, it discloses to set the period of two different materials having different refractive indexes (that is the thickness of a pair of two different materials) at nearly half the wavelength of light used. This document teaches that the structure can be used to manufacture a wavelength converter by second harmonic generation, if a second-order non-linear optical material is used, and an optical switch if a third-order non-linear optical material is used.

Wavelength converter devices using the four-wave mixing process are known.

EP 0 981 189 discloses a non-linear wavelength converter device comprising an optical waveguide doped with a rare earth element. An input optical signal and at least one pump light cause four wave mixing (FWM) to occur in the optical waveguide and the FWM causes a converted optical signal to be produced in the optical waveguide. The optical signal and the pump light are amplified in the optical waveguide thereby the four-wave mixing converted optical power is increased.

In order to increase the four-wave mixing converted optical power, also wavelength converter devices using the four-wave mixing process in a single optical resonator have been disclosed.

P. P. Absil et al. ("*Wavelength conversion in GaAs micro-ring resonators*", Optics Letters, Vol. 25, No. 8, Apr. 15, 2000, pages 554-556) disclose a device comprising a single micro-ring resonator wherein a pump wave of frequency $\omega_p$ and a signal wave of frequency $\omega_s$ are launched into the ring at two different resonant frequencies. A new converted wave is generated by degenerate FWM at the frequency $\omega_g=2\omega_p-\omega_s$. The Authors states that non-linear interactions are enhanced in the resonator.

U.S. Pat. No. 5,243,610 disclose a device comprising an input for an input light signal, an optical source for generating a pump light signal, a non-linear optical medium for receiving the pump and input light signals and an output. The non-linear optical medium includes a Fabry-Perot type semiconductor laser and frequency converts the input light signal to generate an output light signal using non-degenerate four-wave mixing. In this document it is stated that the FWM may be generated at a relatively lower power due to an internal electric field enlarged by confining the pump light and input signal light into a resonator.

U.S. Pat. No. 5,550,671 discloses a device comprising an input for a signal radiation, an optical source for generating a pump radiation, a laser cavity and an output. The laser cavity is composed of a rare-earth doped fiber and is defined by a pair of fiber Bragg gratings. By propagating through the laser cavity the signal and pump radiation generate by four wave mixing a new converted signal of wavelength within 10% of the signal radiation wavelength. In this document it is stated that the device can be made in compact form with a cavity length as small as 100 m and can provide inverted signals at the same intensity as the input signals.

The Applicant notes that in the above mentioned devices with a single optical resonator, the four-wave mixing converted optical power (i.e. the optical power of the radiation generated by four-wave mixing) depends on the pump power, on the resonator physical length and on the power reflectivity of the reflectors forming the resonator.

For cost, availability and reliability reasons, the pump power should be kept as low as possible. Therefore, the resonator physical length and the power reflectivity should be kept as high as possible in order to achieve high converted optical power values.

However, in this regard the Applicant notes that also the frequency difference between two consecutive resonant frequencies (free spectral range or FSR) and the bandwidth B of an optical resonator depend on the physical length and on the power reflectivity. Furthermore, for use in a WDM optical communication system, the FSR and bandwidth B of the resonator should be set according to the WDM system requirements (e.g., the bandwidth B' of the WDM optical signals and the wavelength spacing thereof which is typically selected according to ITU-T recommendations).

It follows that, the physical length and the power reflectivity of the optical resonator should be selected according to the WDM optical communication system requirements and cannot be freely set to any desired value.

Accordingly, the Applicant notes that external factors may not allow desired values of the FWM converted optical power to be achieved. Thus, the above mentioned devices, using the four-wave mixing process in a single optical resonator, are not versatile.

The Applicant has thus faced the technical problem of providing an efficient and versatile wavelength converter device, capable of achieving high converted optical power values and, at the same time, meeting WDM optical communication system requirements.

SUMMARY OF THE INVENTION

It is a first aspect of the present invention a wavelength converter device, for generating a converted radiation at frequency $\omega_g$ by interaction between at least one pump radiation at frequency $\omega_p$ and at least one signal radiation at frequency $\omega_s$, comprising an input for said at least one signal radiation at frequency $\omega_s$;

a pump light source for generating said at least one pump radiation at frequency $\omega_p$;

an output for taking out said converted radiation at frequency $\omega_g$;

a structure for transmitting said signal and pump radiation, said structure including one optical resonator comprising a non-linear material, having an optical length of at least $40*\lambda/2$, wherein $\lambda$ is the wavelength of the pump radiation, and resonating at the pump, signal and converted frequencies $\omega_p$, $\omega_s$ and $\omega_g$, characterized in that said structure comprises a further optical resonator coupled in series to said optical resonator, said further optical resonator comprising a non-linear material, having an optical length of at least $40*\lambda/2$, wherein $\lambda$ is the wavelength of the pump radiation, and resonating at the pump, signal and converted frequencies $\omega_p$, $\omega_s$ and $\omega_g$; wherein by propagating through said structure the pump and signal radiation generate said converted radiation by non-linear interaction within said optical resonators.

As disclosed in more detail hereinafter, in the device of the invention the converted optical power depends on the resonator optical length, the resonator power reflectivity and the number of cascaded optical resonators. Therefore, even if the resonator optical length and the resonator power reflectivity are constrained by external factors, the desired converted optical power value can still be achieved by suitably selecting the number of cascaded optical resonators.

Thus, the device of the invention can be suitably designed both to achieve high converted optical power values and to meet WDM optical communication system requirements.

In the present description and claims, the expression "resonator" is used for indicating a device with a bounded path of such dimension that a standing electromagnetic wave can be sustained by application of energy of appropriate frequency. Typical examples of an optical resonator are a guiding medium (conventionally named "resonant cavity" or "cavity") bounded by two cascaded partially reflecting mirrors or a closed-ring optical waveguide (conventionally named "microring") with a coupling portion to allow the electromagnetic radiation to enter and exit from the ring. The optical resonator has a comb of resonant frequencies that are substantially equispaced in frequency. The distance between two adjacent resonant frequencies is named free spectral range (FSR). The FSR depends on the group length $L_g$ of the resonator (FSR=$c/L_g$). $L_g$ is defined as $L_g=c*\tau_g$, wherein c is the speed of light and $\tau_g$ is the group delay of the resonator which depends on the type of the resonator and on the material. In the case of a guiding medium bounded by two cascaded partial reflectors, non-dispersive medium and concentrated reflectors, $L_g$ is twice the optical distance between the two reflectors. In the case of distributed reflectors $L_g$ can be numerically calculated by techniques well known in the art as, for example, by means of the "coupled mode theory" (see for example S. Legoubin et al., "*Free spectral range variations of grating-based Fabry-Perot filters photowritten in optical fibers*", J. Optical Society of America, August 1995, Vol. 12, No. 8, pages 1687-1694).

Lastly, in the case of a closed-ring optical waveguide in a non-dispersive medium $L_g$ is the optical length of the ring.

Moreover, in the present description and claims, the expression

"optical length" for a radiation propagating in a propagation medium is used for indicating the product between the refractive index of the medium and the physical length thereof;

"four wave mixing efficiency" is used for indicating the ratio $P_c/(P_p^2 * P_s)$ where $P_c$ is the converted radiation optical power, $P_p$ the pump radiation optical power and $P_s$ the signal radiation optical power;

"bandwidth" B for an optical resonator is used for indicating the full width at half maximum (FWHM) of each resonance;

"power reflectivity" or "reflectivity" is used for indicating either the ratio between the power of the radiation reflected by a partially reflecting mirror of a resonant cavity and the power of the incident radiation, or the ratio between the power of the radiation not coupled outside by the coupling portion and the power of the incident radiation in a closed-ring optical waveguide resonator;

"reflector" is used for indicating an element adapted to form a resonator as, for example, a mirror of a resonant cavity, a coupling portion of a closed-ring optical waveguide resonator or a defect in a photonic crystal waveguide cavity;

"partial reflector" is used for indicating a reflector having a power reflectivity lower than 100%;

"multiresonator structure" is used for indicating a structure comprising a plurality of cascaded optical resonators;

"multistage device" is used for indicating a device comprising a plurality of cascaded structures with phase-mismatch compensating elements interposed between one structure and the other;

"non-linear material" is used for indicating a material having at least one of the $\chi_2$, $\chi_3$ susceptibility coefficients greater than zero.

Furthermore, in a WDM optical communication system, the signal radiation having different wavelengths are each assigned a specific band of wavelengths having predetermined width—hereinafter called "channel". Each of said channels is characterised by a central wavelength value and by a range of wavelength, centred about said central wavelength, which is defined "signal bandwidth or band" B'.

The dependent claims set out particular embodiments of the invention.

The non-linear material of the optical resonators can be of the $\chi_2$ type. Advantageously, it is of the $\chi_3$ type. In this latter case, the converted radiation is preferably generated by four-wave-mixing. In a preferred embodiment of the invention, the four-wave-mixing is of the degenerate type.

In a preferred embodiment of the invention, the pump radiation frequency $\omega_p$ and the signal radiation frequency $\omega_s$ are different.

Advantageously, the optical resonator and the further optical resonator are directly connected in series.

Advantageously, the optical resonator and the further optical resonator are made of the same material. This facilitates the manufacturing process of the structure.

Advantageously the optical resonator and the further optical resonator are made of a transparent material at the working wavelengths (or frequencies) of the device.

For example, the working wavelengths are selected within the interval comprised between 0.7 μm and 1.9 μm. According to a variant, they are selected within the interval comprised between 0.7 μm and 1.8 μm. Preferably, the working wavelengths are greater than 1.2 μm, more preferably greater than 1.4 μm. Typically, they are lower than 1.7 μm.

Advantageously, the optical resonator and the further optical resonator have the same optical length.

Preferably, the optical resonator and the further optical resonator resonate at three different resonant frequencies substantially equal to the pump, signal and generated frequencies $\omega_p$, $\omega_s$, $\omega_g$, respectively.

According to another embodiment of the invention, the pump, signal and generated frequencies $\omega_p$, $\omega_s$, $\omega_g$ fall within the same resonant frequency of the optical resonator and the further optical resonator.

Advantageously, the optical resonator and the further optical resonator each have a free spectral range equal to or lower than 4 THz. In fact, higher values of the free spectral range would imply higher values of frequency spacing ΔF between the pump and signal radiation and, thus, an appreciable decrease of the FWM converted optical power due to chromatic dispersion. Preferably, the optical resonator and the further optical resonator each have a free spectral range equal to or lower than 1000 GHz. More, preferably, the optical resonator and the further optical resonator each have a free spectral range equal to or lower than 500 GHz. According to a variant, the optical resonator and the further optical resonator each have a free spectral range equal to or lower than 100 GHz. According to another variant, the optical resonator and the further optical resonator each have a free spectral range equal to or lower than 50 GHz. According to another variant, the optical resonator and the further optical resonator each have a free spectral range equal to or lower than 25 GHz.

The frequency spacing ΔF between the pump and signal radiation is substantially equal to the free spectral range of the optical resonators or is an integer multiple thereof.

Advantageously, the optical resonator and the further optical resonator each have a bandwidth B of at least 100 MHz. Preferably, the bandwidth B is of at least 1 GHz. More preferably, the bandwidth B is of at least 2.5 GHz. More preferably, the bandwidth B is of at least 10 GHz. Even more preferably, the bandwidth B is of at least 20 GHz. Even more preferably, the bandwidth B is of at least 40 GHz. Even more preferably, the bandwidth B is of at least 100 GHz. The above mentioned values allow the device of the invention to be used with typical telecommunications optical signal radiation modulated at 100 Mbit/s, 1, 2.5, 10, 20 and 40 Gbit/s. Preferably, the bandwidth B of the optical resonator and of the further optical resonator is greater than the bandwidth of the optical signal radiation. More preferably, the bandwidth B of the optical resonator and of the further optical resonator is at least twice the bandwidth of the optical signal radiation.

The optical signal radiation may be continuous wave (CW) signals or may be modulated in amplitude, intensity, phase, frequency, polarization, according to any conventional technique, with any conventional format (e.g. NRZ, RZ, CRZ, soliton, duobinary).

Preferably, the optical resonator and the further optical resonator comprise reflectors having a power reflectivity of at least 0.5. Advantageously, the optical resonator and the further optical resonator comprise reflectors having a power reflectivity lower than or equal to 0.9997 (corresponding to a transmissivity of −35 dB).

Preferably, the reflectors comprised in the optical resonator have the same power reflectivity of the reflectors comprised in the further optical resonator.

Advantageously, the ratio FSR/B for the optical resonator and the further optical resonator is at least equal to 2.

Advantageously, the ratio FSR/B for the optical resonator and the further optical resonator is lower than or equal to 100.

Preferably, the optical resonator and the further optical resonator each have an optical length lower than or equal to $7500*\lambda/2$. Values of optical length higher than $7500*\lambda/2$ would involve too low FSR and bandwidth B values (see Eq. 2b below). On the contrary, values of optical length lower than $40*\lambda/2$ would involve too high FSR values and, consequently, too high frequency spacing $\Delta F$ values between the pump and signal radiation and an appreciable decrease of the FWM converted optical power, due to chromatic dispersion.

According to a first embodiment of the invention, the optical resonator is a Fabry-Perot like cavity bounded by two partially reflecting mirrors. Preferably, the further optical resonator is a Fabry-Perot like cavity bounded by two partially reflecting mirrors.

According to an embodiment, the partially reflecting mirrors are concentrated. According to another embodiment, they are distributed.

Advantageously, the Fabry-Perot like cavity is formed in a rare-earth doped bulk medium or a rare-earth doped waveguide or optical fiber.

According to a second embodiment of the invention, the optical resonator is a microring like resonator. Preferably, the further optical resonator is a microring like resonator.

According to a third embodiment of the invention, the optical resonator is formed in a photonic crystal waveguide. Preferably, the further optical resonator is formed in a photonic crystal waveguide.

Advantageously, the optical resonator and the further optical resonator comprise partial reflectors each having a uniform power reflectivity in the whole wavelength range of interest (for example, at the pump, signal and converted radiation frequencies).

Preferably, the optical power of the converted radiation is of at least 100 nW.

Advantageously, the optical power of the pump radiation is of at least 100 mW.

Advantageously, the optical power of the signal radiation is of at least 1 mW.

The non-linear material of the optical resonators is advantageously selected from the group comprising $SiO_2$, $TeO_2$, $Al_x(GaAs)_{1-x}$, $LiNbO_3$, Si, InP, polymers, such as for example, PPV [poly(phenylene-vinylene)] or MEH-PPV (poly[2-methoxy, 5-(2'-ethyl-hexyloxy)-p-phenylene-vinylene]), and combinations thereof.

The structure preferably further comprises a third optical resonator cascaded to the further optical resonator. As to the features of the third optical resonator, reference is made to what disclosed above with reference to the optical resonator and to the further optical resonator.

Preferably, the number of optical resonators cascaded in the structure is lower than $N_{max}$, where $N_{max}$ is equal to the ratio between the coherence length $L_{coh}$ of the structure and the physical length d of each optical resonator (see Eq. 7 below).

Typically, the output of the device comprises an optical filter coupled at the exit of the structure, adapted to take out the radiation generated at frequency $\omega_g$ from the device and to suppress a possible residual pump radiation at frequency $\omega_p$ and a possible residual signal radiation at frequency $\omega_s$.

According to an embodiment of the invention the wavelength converter device comprises a further structure in series to the structure. In this embodiment, the device preferably comprises also a phase mismatch compensating element adapted to compensate for the phase mismatch accumulated by the pump and signal radiation along the structure. Said phase mismatch compensating element is advantageously placed between the structure and the further structure.

As to the features of the further structure and the optical resonators therein comprised, reference is made to what disclosed above.

Preferably, the structure and the further structures have the same number of cascaded optical resonators. Furthermore, the optical resonators of the structure are preferably the same as the optical resonators of the further structure.

Advantageously, the structure and the further structures are substantially equal.

Advantageously, the phase mismatch compensating element comprises a material having a non-linear refractive index n2 lower than the non-linear refractive index of the material included in the structure and the further structure.

Preferably, the second order dispersion coefficients $\beta_2$ and $\hat{\beta}$ at the pump radiation frequency of the materials included in the structures and in the phase mismatch compensating element have opposite sign.

According to another embodiment, the second order dispersion coefficients $\beta_2$ and $\hat{\beta}$ at the pump radiation frequency of the materials included in the structures and in, the phase mismatch compensating element have the same sign.

The phase mismatch compensating element can comprise either an optical dielectric waveguide, a dispersive plate or an optical fiber.

According to another aspect, the present invention relates to a use of a structure comprising a plurality of cascaded optical resonators for generating a radiation at frequency $\omega_g$ through non-linear interaction of at least one pump radiation at frequency $\omega_p$ with at least one signal radiation at frequency $\omega_s$, wherein said resonators comprise a non-linear material, resonate at the pump, signal and converted frequencies $\omega_p$, $\omega_s$ and $\omega_g$, and have an optical length of at least $40*\lambda/2$, wherein $\lambda$ is the wavelength of the pump radiation.

Preferably, the radiation at frequency $\omega_g$ is generated by four-wave mixing. More preferably, by degenerate four-wave-mixing.

As to the features of the structure and the optical resonators reference is made to what disclosed above with reference to the wavelength converter device of the invention.

According to a further aspect, the present invention relates to a use of a structure, comprising a plurality of cascaded optical resonators comprising a non-linear material, for altering the optical spectrum of at least one signal radiation at frequency $\omega_s$ propagating through it, by non-linear interaction of the optical signal radiation within the material of the optical resonators, wherein said optical resonators resonate at the signal radiation frequency $\omega_s$ and have an optical length of at least $40*\lambda/2$, wherein $\lambda$ is the wavelength of the signal radiation.

Preferably, the optical spectrum is altered by using self-phase modulation non-linear phenomenon.

Advantageously, the optical spectrum is altered through interaction with at least one pump radiation at frequency $\omega_p$ by using cross-phase modulation non-linear phenomenon. In this case, the optical resonators preferably also resonate at the pump radiation frequency $\omega_p$.

As to the features of the structure and the optical resonators reference is made to what disclosed above with reference to the wavelength converter device of the invention.

In a further aspect thereof, the present invention relates to an apparatus for an optical network node comprising
- a routing element with at least one input port and a plurality of output ports for interconnecting each input port with at least one corresponding output port;
- at least one wavelength converter device according to the invention optically coupled to one of the ports of said routing element.

As to the structural and functional features of the wavelength converter device, reference shall be made to what described above.

Typically, the apparatus also comprises at least one 1×K1 demultiplexer device. Said 1×K1 demultiplexer device is typically optically coupled to K1 input ports of the routing element.

Typically, the apparatus also comprises at least one K2×1 multiplexer device. Said K2×1 multiplexer device is typically optically coupled to K2 output ports of the routing element.

Advantageously, the routing element is selected from the group comprising the following elements: add-drop, cross-connect, λ-router (i.e. wavelength selective router) and switch, and a combination thereof.

Advantageously, the apparatus also comprises N input optical fibers (with N≧1). In one embodiment, the N input optical fibers are optically coupled to N respective 1×K1 demultiplexer devices.

Advantageously, the apparatus also comprises M output optical fibers (with M≧1 and equal to or different from N). In one embodiment, the M output optical fibers are optically coupled to M respective K2×1 multiplexer devices.

In a further aspect thereof, the present invention relates to an optical communication line comprising an optical transmission path for transmitting at least one signal radiation at frequency $\omega_s$ and a wavelength converter device according to the invention, wherein said wavelength converter device is optically coupled to said optical transmission path and generates a radiation at frequency $\omega_g$ by non-linear interaction between at least one pump radiation at frequency $\omega_p$ and said at least one signal radiation at frequency $\omega_s$.

As regards the structural and functional features of the wavelength converter device, reference shall be made to what described above.

Advantageously, the optical transmission path is an optical fibre length.

Typically, said optical communication line further comprises a transmitting station for providing said at least one signal radiation at a frequency $\omega_s$.

Advantageously, the transmitting station is adapted to provide a plurality n of optical signals having frequencies $\omega_{s1}$, $\omega_{s2}$ ... $\omega_{sn}$ differing from one another. Preferably, the transmitting station comprises a wavelength multiplexing device for wavelength multiplexing the plurality n of optical signals into a single WDM optical signal and for sending said WDM optical signal along the optical communication line.

Typically, said optical communication line further comprises a receiving station connected to said optical communication line.

The receiving station advantageously comprises a wavelength demultiplexer device adapted to demultiplex a WDM optical signal coming from the optical communication line. Furthermore, the receiving station is typically adapted to provide the demultiplexed signals to optional further processing stages.

According to an embodiment, the optical communication line comprises an optical node comprising an apparatus according to the invention, wherein said wavelength converter device of the line is comprised in the apparatus.

BRIEF DESCRIPTION OF THE DRAWINGS

Further features and advantages of the present invention will appear more clearly from the following detailed description of a preferred embodiment, made with reference to the attached drawings. In such drawings.

FIGS. 2a and 2b show a diagram illustrating the principle of FWM wavelength conversion according to first and second embodiment of the invention;

FIG. 7 shows a schematic view of a Fabry-Perot like multiresonator structure according to a first embodiment of the invention;

DETAILED DESCRIPTION OF THE INVENTION

Figure 1A:
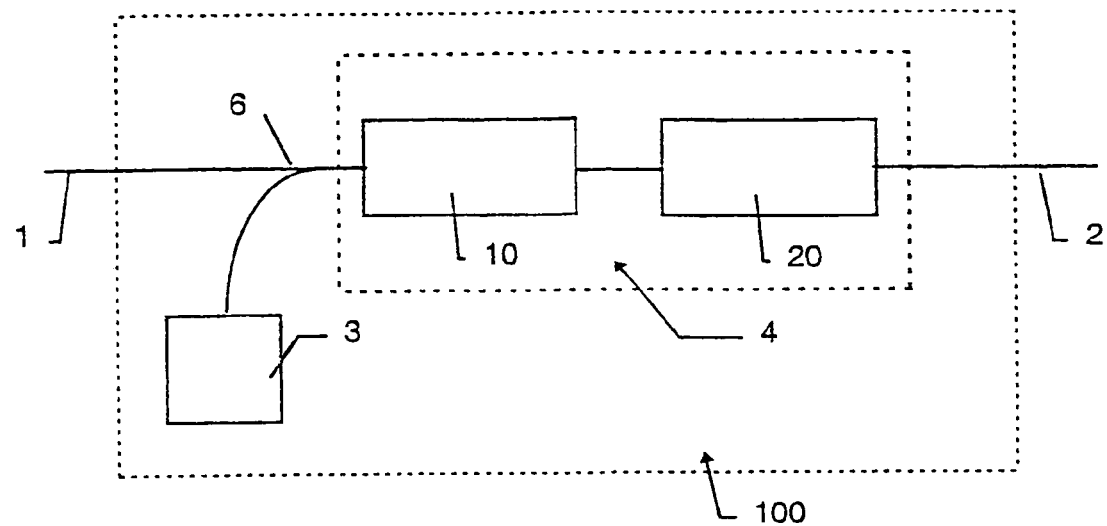
FIGS. 1a and 1b show a schematic view of a wavelength converter device according to first and second embodiment of the invention.

FIG. 1a shows a wavelength converter device 100 comprising an input 1, an output 2, a pump light source 3 and a multiresonator structure 4 including a plurality of optical resonators (for simplicity, only 2 resonators 10, 20 are shown in FIG. 1a) directly connected in series.

Advantageously, the wavelength converter device 100 further comprises an optical isolator (not shown) for eliminating any back reflected radiation exiting the device 100 through the input 1. Typically, the optical isolator is placed between the input 1 and the first optical resonator 10.

Advantageously, the wavelength converter device 100 comprises an optical amplifier. Typically, the amplifier is placed at the output 2. For example, the optical amplifier is an erbium-doped fiber amplifier.

The input 1 is adapted to receive at least one signal radiation at frequency $\omega_s$.

The pump light source 3 is adapted to generate at least one pump radiation at frequency $\omega_p$.

Furthermore, the pump light source 3 is coupled to the structure 4 through a conventional optical coupler 6. Preferably, the optical coupler 6 is a wavelength selective coupler.

The structure 4 is adapted to receive said signal and pump radiation.

The optical resonators 10, 20 are made of a non-linear material, each have at least two resonant frequencies substantially equal to the pump and signal frequencies $\omega_p$ and $\omega_s$ and an optical length higher than at least 40*$\lambda$/2, wherein $\lambda$ is the wavelength of the pump radiation.

By propagating through the structure 4, the pump and signal radiation cause the generation of a converted radiation at frequency $\omega_g$ exploiting the non linear properties of the material of the optical resonators.

The output 2 is adapted to take out the converted radiation at frequency $\omega_g$.

In a preferred embodiment of the invention, the material of the optical resonators has a non-linearity of the $\chi_3$ type. Moreover, the signal and pump frequencies $\omega_s$ and $\omega_p$ are different and the radiation at frequency $\omega_g$ is generated using the degenerate four-wave mixing (FWM) process.

FIG. 2a schematically shows the degenerate four-wave mixing process $\omega_g=2\omega_p-\omega_s$, wherein $\omega_s=\omega_p-n\Delta\omega$, n is an integer number and $\Delta\omega$ is the free spectral range of the optical resonators.

The applicant notes that, signal resonance 152 is not necessarily the first resonant frequency close to pump resonance 151, but can be shifted of an integer number n of free spectral ranges; signal resonance 152 may be at a lower frequency than pump resonance 151 or at a higher frequency as well and, according to FWM properties, the converted radiation is the phase conjugated of the signal radiation and falls into the symmetrical resonance mode 153 with respect to the pump resonance 151. Furthermore, according to the principles of FWM wavelength conversion, in case of modulated signal radiation, the same modulation is transferred to the converted radiation.

In FIG. 2a the pump radiation frequency $\omega_p$ and the signal radiation frequency $\omega_s$ are tuned to two different resonant frequencies of the optical resonators 10, 20. However, as shown in FIG. 2b, they may also fall within the same resonant frequency 154 of the optical resonators 10, 20, according to another embodiment of the invention.

The Applicant notes that an important requirement for the device of the invention is that the optical resonators 10, 20 both resonate at the pump, signal and converted frequencies. However, it is not necessary that they have the same finesse F (F=FSR/B). As shown below (see Eq. 2), this means that the optical resonators 10, 20 may have different values of power reflectivity R and optical length. However, in a preferred embodiment they have the same optical length. In a further preferred embodiment the reflectors included in the optical resonators 10, 20 have the same power reflectivity.

Some basic notions for degenerate FWM are now briefly illustrated.

For a non-resonant waveguide structure and in the hypothesis of slowly varying envelope, undepleted pump, negligible self phase modulation, lossless media, the spatial evolution of the optical power $P_c$ of the FWM converted radiation satisfies the following equation:

$$P_c(z) = \gamma^2 P_p^2 P_s z^2 \mathrm{sinc}^2\left(\frac{\Delta k \cdot z}{2}\right) \qquad (1)$$

where z is the spatial coordinate, $P_p$ is the optical pump power and $P_s$ is the optical signal power. $\gamma$ is a coefficient that depends on the non-linear refractive index $n_2$ and on the waveguide effective area $A_{eff}$, while $\Delta k = 2k_p - k_s - k_c$ takes into account the impact on frequency conversion efficiency of the phase mismatch due to the different wave vectors of interacting fields. Since $\gamma$ is typically a small number (about $1.5\cdot 10^{-3}$ m$^{-1}$W$^{-1}$ in a silica fiber) high pump power (about 1 W) and extremely long device (of the order of Km) are generally required.

From this point of view the Applicant notes that the use of an optical resonator for carrying out a FWM process leads to a double advantage.

First of all, a radiation, whose frequency coincides with a resonant frequency of the optical resonator, spends much more time through the resonator of physical length $L_f$ than through a non-resonant waveguide structure of the same length. This effect derives from the fact that the group velocity $v_{in}$ within the optical resonator is lower than the group velocity $v_{out}$ within a non-resonant waveguide structure. As a consequence the interaction time between an optical pump radiation and a signal radiation is considerably increased when both optical radiation are suitably tuned near a resonant frequency. The more the propagation is slowed ($v_{in} < v_{out}$) the longer the interaction time within the resonator. Since FWM is an interaction time dependent process, the conversion efficiency in an optical resonator is higher than in an equivalent non-resonant waveguide structure of the same physical length $L_f$.

Moreover, within the optical resonator, a radiation whose frequency coincides with a resonant frequency of the optical resonator, has a power $P_{int}$ strongly enhanced with respect to the power $P_{out}$ within a non-resonant waveguide structure. This effect too is due to the above mentioned slowed propagation group velocity and the more the propagation is slowed, the higher $P_{int}$ compared to $P_{out}$. Since FWM is an intensity dependent process, the conversion efficiency in an optical resonator is further improved compared to that of an equivalent non-resonant waveguide structure of the same physical length $L_f$.

The FWM process in an ideal infinite periodic structure made of cascaded optical resonators is now described.

As also described hereinafter in more detail, the cascaded optical resonators can be made from a series of directly coupled Fabry-Perot like cavities, optical microrings or a photonic band gap (PBG) waveguide with proper defects therein.

In the following description the main topics of an ideal infinite Fabry-Perot like multiresonator structure is described, even if the same teachings can be applied to optical microring and PBG structures.

Figure 3:
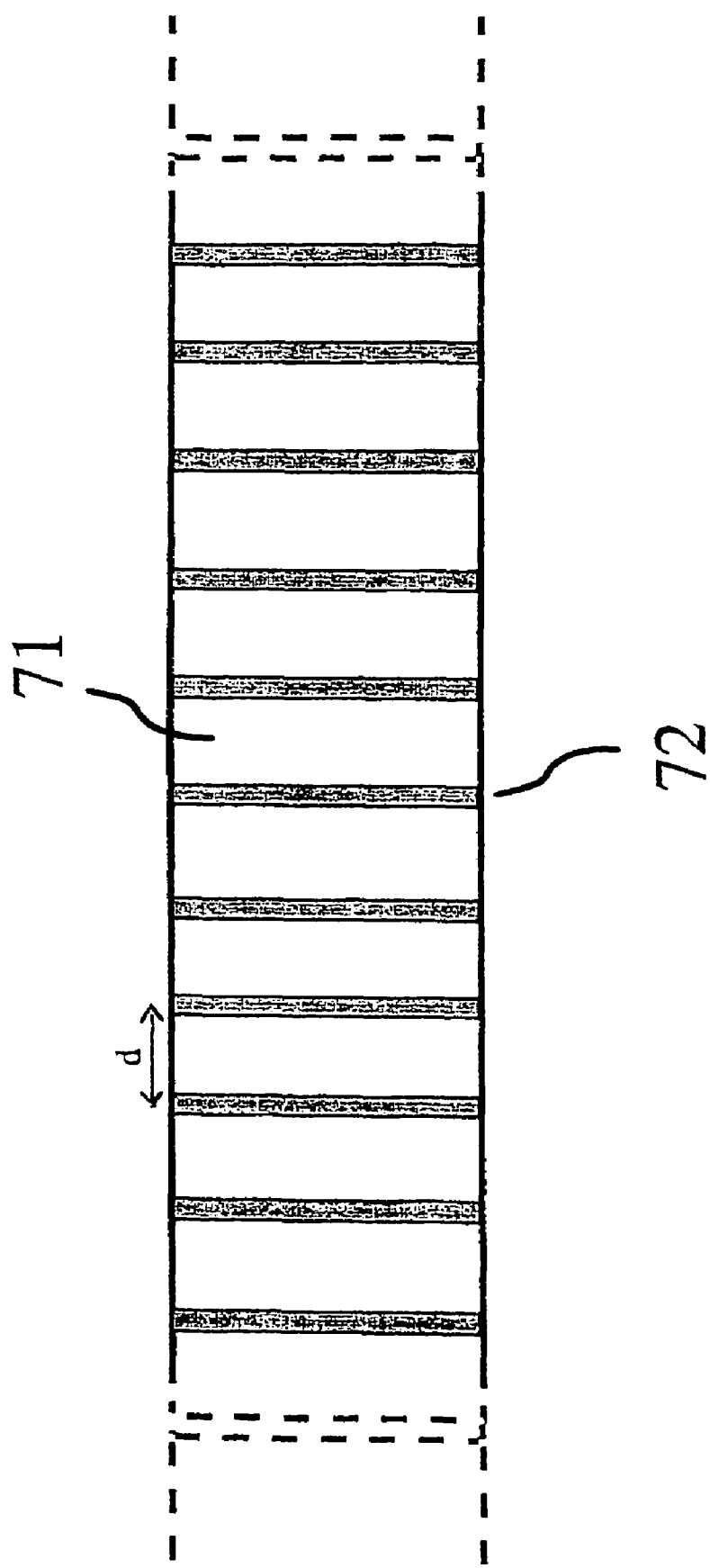
FIG. 3 shows a schematic view of an ideal infinite periodic Fabry-Perot like multiresonator structure.

FIG. 3 shows said multiresonator structure wherein partially reflecting mirrors 72 are placed at a distance d from each other into a substrate 71 of refractive index n.

This multiresonator structure has a periodic spectral response. Only a radiation whose spectrum lies inside a pass-band resonance of the structure can propagate; otherwise the radiation is backward reflected.

Important parameters of this kind of multiresonator structure have been theoretically determined by the Applicant.

The bandwidth B of such structure is given by $$B = \frac{2FSR}{\pi} \arcsin(t) \quad (2)$$

where t is the field transmission coefficient of each mirror 72 and FSR=c/2nd (Eq. 2b) is the free spectral range, i.e. the frequency difference between two consecutive resonant frequencies of the multiresonator structure. In Eq. 2b, nd is the optical length of each optical resonator.

Thus, the selective behaviour of the structure, expressed by the finesse F=FSR/B, only depends on the power reflectivity R of the mirrors 72 (where R=1−$t^2$).

Figure 4B:
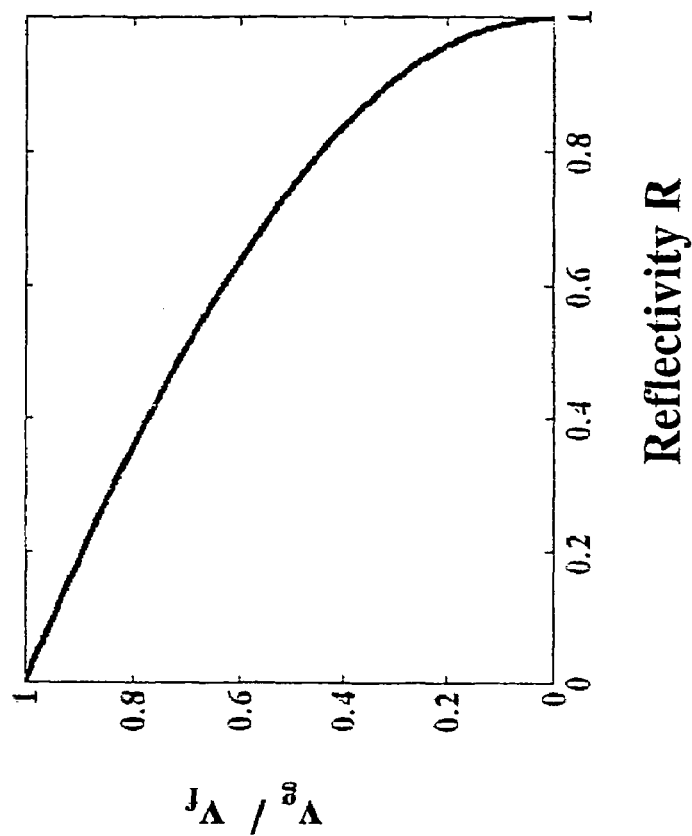
FIG. 4 shows a plot of the ratio B/FSR versus the power reflectivity of the mirrors for the structure of FIG. 3 (FIG. 4a) and a plot of the ratio $v_g/v_f$ versus the power reflectivity of the mirrors for the structure of FIG. 3 (FIG. 4b)
Figure 4A:
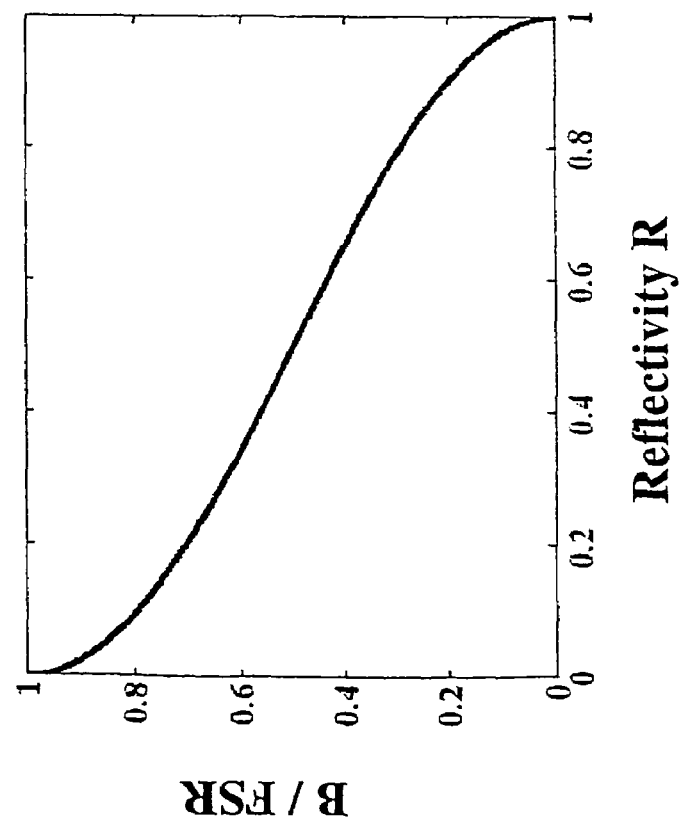

As shown in FIG. 4a, the ratio between the bandwidth B and the FSR, i.e. the inverse of the finesse F, decreases versus an increasing mirror power reflectivity R.

Since intra-resonator propagation constant β is a function of ω, the multiresonator structure introduces a periodic frequency dispersion. The group velocity, defined as dω/dβ, is found to be at each resonant frequency $$v_g(f_0) = \frac{c}{n} t = v_f t \quad (3)$$

where $v_f$=c/n is the phase velocity of the optical field in the intra-resonator medium and $f_0$ is the resonant frequency of the structure. As the transmission coefficient is always less than unity, the group velocity within the structure is always lower than the phase velocity.

In FIG. 4b the ratio between the reduced intra-resonator group velocity $v_g(\omega_0)$ and the phase velocity $v_f$ is plotted versus the power reflectivity R of mirrors 72.

As shown in FIG. 4b, the ratio $v_g(\omega_0)/v_f$ decreases versus an increasing mirror power reflectivity R.

Therefore, high reflectivity mirrors 72 may practically reduce up to zero the group velocity of a propagating pulse (thereby increasing the conversion efficiency), even though this effect involves a bandwidth B reduction.

The Applicant found that the above mentioned results still hold for a finite quasi periodic multiresonator structure, when a sufficiently large number of resonators are employed (e.g. 5 resonators). However, the advantages of the invention stand up also for a structure with only two cascaded resonators (see FIG. 6).

A good estimate for the conversion gain G (that is, the ratio between the FWM converted optical power $P_{c,mrs}$ in a multiresonator structure and the FWM converted optical power $P_c$ in a non-resonant waveguide structure using the same pump and signal radiation and the same non linear medium) of the multiresonator structure of FIG. 3 is given by $$G \cong \left(\frac{1+t^2}{2t^2}\right)^2 \quad (4)$$

where t is the field transmission coefficient of each mirror.

Figure 5:
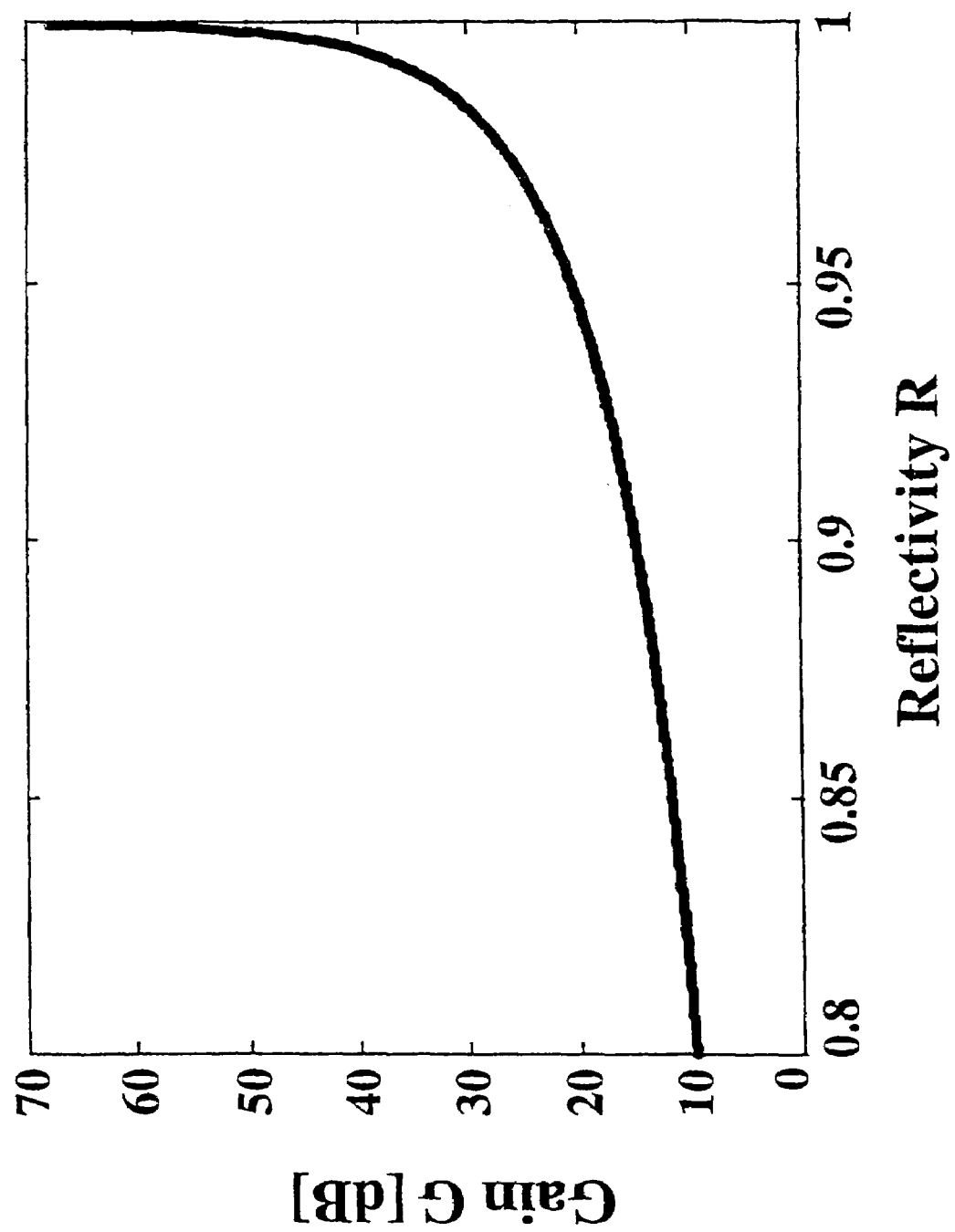
FIG. 5 is a plot of the conversion gain versus the power reflectivity of the mirrors for the structure of FIG. 3.

FIG. 5 shows the behaviour of the conversion gain G versus the mirror power reflectivity R. An extremely high conversion enhancement can be achieved using high reflectivity mirrors.

Taking into account Eq. (1), the FWM converted optical power $P_{c,mrs}$ for an ideal infinite multiresonator structure is given by $$P_{c,mrs} = \gamma^2 P_p^2 P_s z^2 \text{sinc}^2\left(\frac{\Delta\beta \cdot z}{2}\right) G \quad (5)$$

where z is the spatial coordinate and $\Delta\beta=2\beta_p-\beta_s-\beta_c$ is the intra-resonator phase mismatch.

Eq. (4) and (5) hold in the above stated hypothesis of slowly varying field envelope, undepleted pump, negligible self phase modulation and lossless media.

The maximal length of the multiresonator structure is limited by the presence of the phase mismatch $\Delta\beta$ between interacting fields. The phase mismatch $\Delta\beta$ derives from chromatic dispersion, waveguide dispersion, non linear cross phase modulation and self phase modulation. The coherence length of the structure, that is the length after which power starts to turn back from the converted radiation to the pump radiation, is defined as $$L_{coh} = \frac{\pi}{|\Delta\beta|} = \frac{\pi}{|\Delta k|} t \quad (6)$$

where $\Delta k=2k_p-k_s-k_c$ is the phase mismatch term in a non-resonant waveguide structure. Thus, the coherence length in the multiresonator structure is reduced with respect to a non-resonant waveguide structure.

Since highly non linear materials often show a highly dispersive behaviour, chromatic dispersion is typically the dominant factor which limits the coherence length. Non linear cross phase and self phase modulation should be contemplated in a high power conversion process or when chromatic dispersion is very low.

The maximum physical length $L_{max}$ of the multiresonator structure is preferably lower than or equal to the coherence length $L_{coh}$. Therefore, the maximum number of resonators that can be cascaded to form the multiresonator structure preferably is $$N_{max} = \frac{L_{max}}{d} = \frac{L_{coh}}{d} = \frac{\pi t}{|\Delta k| d}. \quad (7)$$

According to Eq. (2) the physical length d of each resonator may be written as $$d = \frac{c}{2nFSR} = \frac{c}{n} \frac{\arcsin(t)}{\pi B} \quad (8)$$

and substituting Eq. (8) into Eq. (7) $N_{max}$ is given by $$N_{max} = \frac{\pi^2 nB}{|\Delta k|c}. \quad (9)$$

where the approximation arcsin(t)=t used in deriving Eq. (9) holds for highly reflective mirrors.

The chromatic dispersion term $\Delta k$ can be expressed in terms of the frequency detuning $\Delta F$ (that is, the frequency spacing $|f_s-f_p|$) between the signal radiation and the pump radiation as $$\Delta k = \beta_2 (2\pi \Delta F)^2 \quad (10)$$

where $\beta_2$ is the second order dispersion coefficient at the pump radiation frequency. Introducing the expression of $\Delta k$, Eq. (9) becomes $$N_{max} = \frac{nB}{4c|\beta_2|(\Delta F)^2}. \quad (11)$$

Equation 11 relates the maximum number of cavity $N_{max}$ to the bandwidth B, the frequency detuning $\Delta F$ and the material dispersion $\beta_2$.

The ratio between the maximum converted output power $P_{c,mrs}$ and input powers $P_p$ and $P_s$ (that is, the maximum FWM efficiency) may be derived from Eq. (4), (5) and (6). Substituting into Eq. (5) the coherence length $L_{coh}$ from Eq. (6), said ratio is given by $$\frac{P_{c,mrs}}{P_p^2 P_s} = \left(\frac{2\gamma}{\Delta k}\right)^2 \left(\frac{1+t^2}{2t}\right)^2 \quad (12)$$

The number of cavities necessary to obtain such a power level is just equal to $N_{max}$.

The Applicant notes that the first factor uniquely depends on non-linear and dispersive material properties while the second factor is given by the multiresonator structure.

To sum up:
a) the bandwidth B and the FSR of the multiresonator structure decrease versus an increasing physical length d of each resonator [see Eq. 2 and Eq. 2b (FSR=c/2nd)];
b) the inverse of the finesse F and the bandwidth B of the multiresonator structure decrease versus an increasing mirror power reflectivity R (see Eq. 2 and FIG. 4a);
c) the conversion gain G increases with an increasing mirror power reflectivity R (see Eq. 4 and FIG. 5);
d) the FWM converted optical power $P_{c,mrs}$ in the multiresonator structure increases with an increasing gain G and an increasing distance z (see Eq. 5);
e) for a multiresonator structure, the spatial coordinate z is equal to N*d, wherein N is the number of cascaded resonators.

Following what said above, while designing a wavelength converter device of the invention, the power reflectivity R and physical length d of each resonator can be selected according to the desired values for finesse F (B/FSR) and bandwidth B of the structure (that is, according to WDM optical communication system requirements, e.g. the bandwidth of the signals and the channel spacing) while the number of cavities N can be selected so as to obtain the desired value for FWM converted optical power $P_{c,mrs}$.

Therefore, in the device of the invention, even if external factors constrain the selection of the power reflectivity R and the physical length d of each resonator, desired values of converted optical power and conversion efficiency can still be obtained by suitably selecting the number N of cavities (with the only restriction that N is preferably less than $N_{max}$).

Accordingly, with respect to a conventional wavelength converter device using the four-wave mixing process in a single optical resonator, the multiresonator structure of the invention has an extra degree of freedom (i.e. the number N of resonators) which allows both an efficient and flexible wavelength converter device to be obtained.

Figure 6:
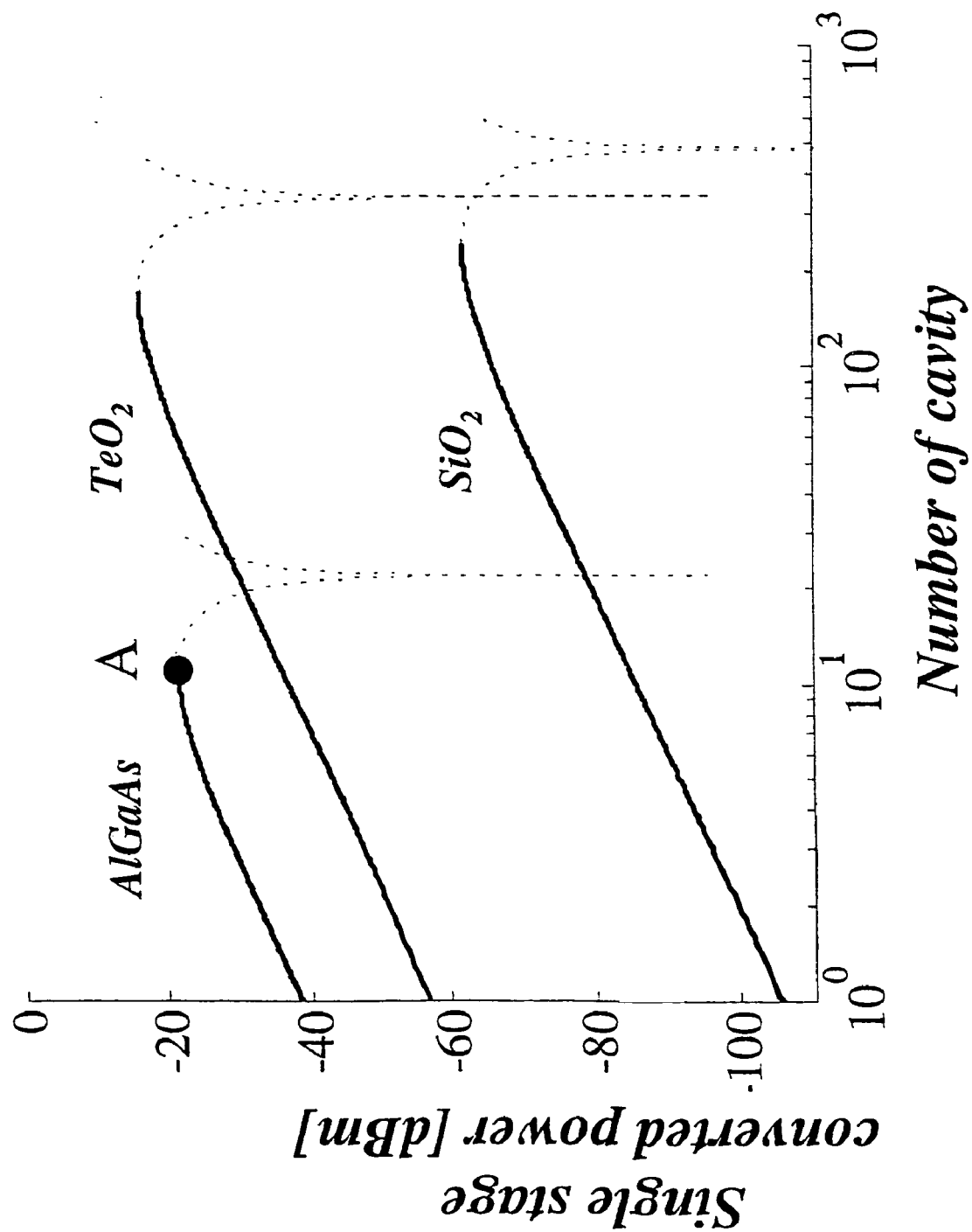
FIG. 6 shows a plot of the maximum converted optical power, which can be achieved using a single stage device of the invention, for different non-linear media.

FIG. 6 shows the maximum converted optical power $P_{c,mrs}$ versus the number N of resonators when different non-linear materials ($SiO_2$, $TeO_2$ and $Al_{0.2}GaAs_{0.8}$) are used to perform FWM wavelength conversion.

The curves of FIG. 6 were obtained through a computer simulation based on Eq. 5 for a bandwidth B of 20 GHz, a frequency detuning $\Delta F$ of 2 THz, 200 GHz spaced WDM channels, an effective area $A_{eff}$ of the waveguide of 10 $\mu m^2$ and pump and signal radiation powers respectively of 100 mW and 10 mW.

For a AlGaAs multiresonator structure the number of cascaded resonators is preferably less than 11. As shown in FIG. 6, a higher number of resonators may lead to a decrease of the FWM converted optical power, due to the high second order dispersion coefficient $\beta_2 \sim 1240$ $ps^2/Km$. A $TeO_2$ ($\beta_2 \sim 52$ $ps^2/Km$) multiresonator structure preferably has less than 170 cascaded resonators and a $SiO_2$ ($\beta_2 \sim -25$ $ps^2/Km$) multiresonator structure preferably has less than about 240 cascaded resonators.

It is worthwhile noting that AlGaAs has a non-linear refractive index n2 more than ten times higher than $TeO_2$ Hence, a slightly inferior converted optical power can be obtained using an extremely low number of resonators.

Resuming the description of the device of FIG. 1, the pump light source 3 is a conventional laser or light emitting diode source.

Advantageously, the output 2 comprises an optical filter (not shown) suitable to let the converted radiation at frequency $\omega_g$ exit from the device 100 and to suppress any residual pump and any residual signal radiation.

When the pump and signal radiation propagate through the structure 4 in the opposite direction, the device 100 preferably comprises also an optical isolator (not shown), placed between the input 1 and the first optical resonator 10, to suppress the counter-propagating residual pump while any residual signal radiation is suppressed by the filter.

The input 1 and output 2 are each advantageously connected to a fibre pigtail for facilitating the connection of the device 100 to other optical fibre elements.

The non-linear material of the optical resonators 10, 20 can be for example selected from the group comprising $SiO_2$, $TeO_2$, $Al_{0.2}GaAs_{0.8}$, polymers (for example, PPV), Si and InP.

The structure 4 can be made from either a waveguide or a bulk multilayer.

Possible waveguides are dielectric waveguides (buried, rib, ridge or diffused), photonic band gap (PBG) waveguides or optical fibers.

The cascaded optical resonators 10, 20 can be made from cascaded Fabry-Perot cavities, cascaded optical microring resonators or proper defects in a photonic band gap waveguide.

Figure 16:
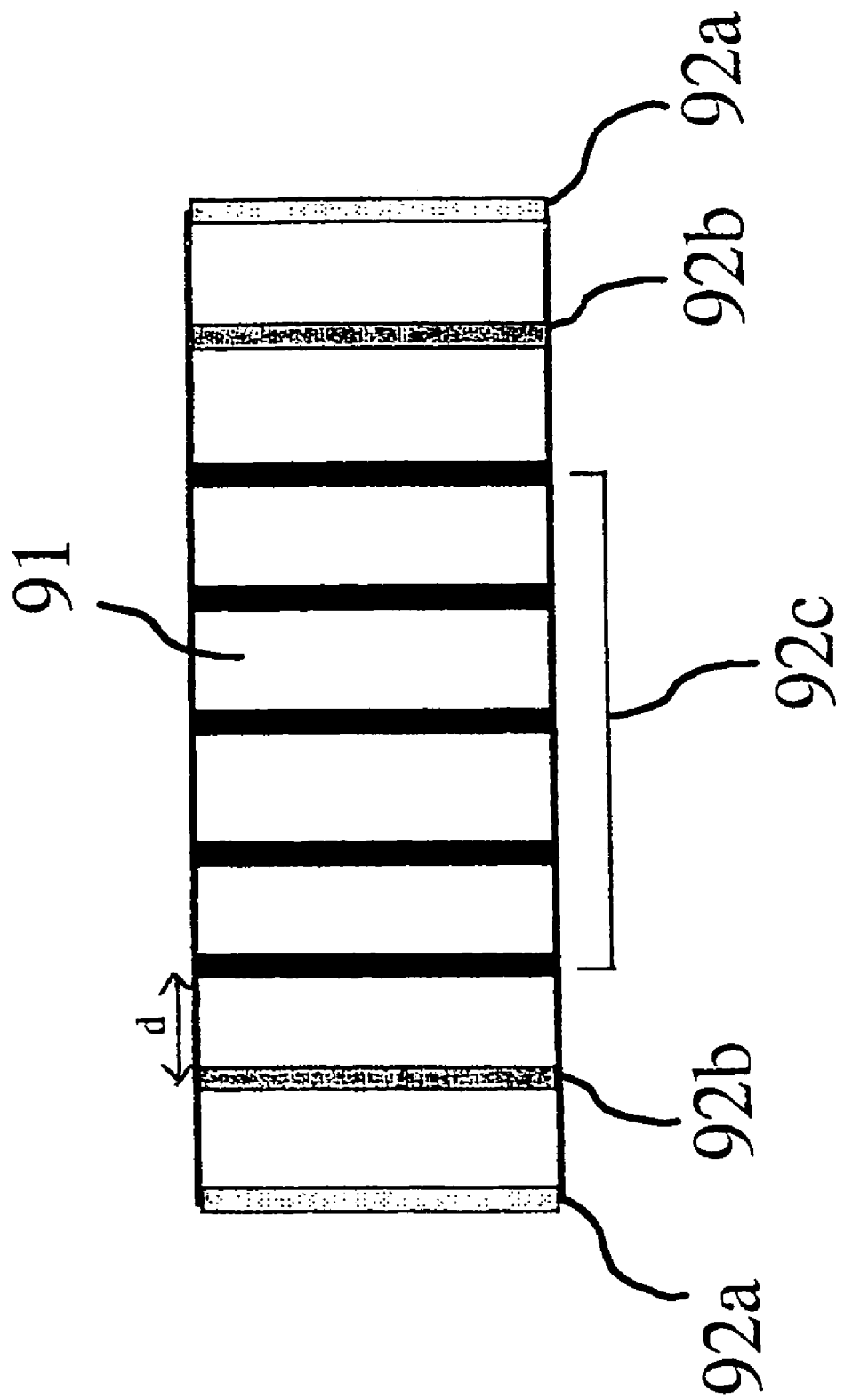
FIG. 16 shows a schematic view of a Fabry-Perot like multiresonator structure according to a further embodiment of the invention.

FIG. 16 shows an example of a finite multiresonator structure 4 made of eight cascaded optical resonators.

In said structure 4, nine partially reflecting mirrors 92 are inserted into a waveguide integrated in a substrate 91 of refractive index n at a distance d from each other. The relatively high impedance of the sequence of resonators is preferably matched to the input and output of the device 100 by introducing at the beginning and at the end of the structure 4 sections having mirrors 92a, 92b with lower reflectivity.

The suitable power reflectivity profile of the mirrors can be obtained through known methods of synthesis of selective bandpass filters based on directly coupled resonator.

For example, using the synthesis technique disclosed in the above mentioned article by A. Melloni et al. ("Synthesis of direct-coupled resonators bandpass filters for WDM systems", Journal of Lightwave Technol., Vol. 20, No. 2, February 2002, pages 296-303), the following power reflectivity profile can be obtained for an eight resonator Chebyshev like structure with a finesse F equal to 5. The power reflectivity R of the internal mirrors 92c is 0.88 while the power reflectivity R of the first 92a and the second 92b mirrors (as well as the power reflectivity R of the last two mirrors 92a and 92b) is respectively 0.28 and 0.765 for the above mentioned impedance matching requirements. As this reflectivity profile performs a 20 dB in band return loss (defined as the ratio between the back reflected optical power and the input optical power), signals tuned closely to a resonant frequency may propagate without noticeably attenuation. Out of band signals are completely reflected because of a more than 60 dB stop band rejection.

Figure 17A:
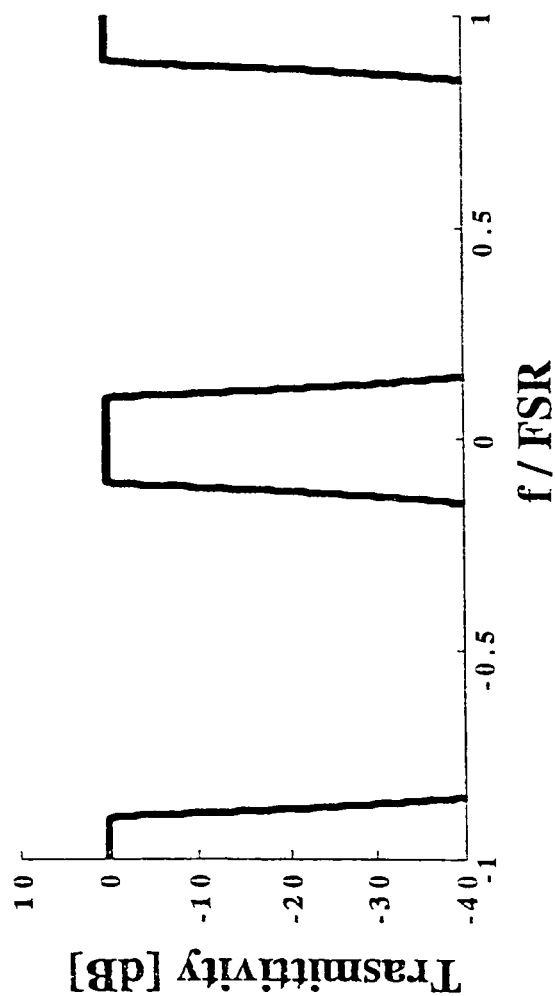
FIG. 17 shows the characteristic transmission profile for the structure of FIG. 16 (FIG. 17a) and the plot of the ratio $v_g/v_f$ versus f/FSR for the structure of FIG. 16 (FIG. 17b)

FIG. 17a shows the power transmittivity (defined as the ratio between the output optical power and the input optical power) versus f/FSR (wherein f is the frequency), for the structure of FIG. 16.

Figure 17B:
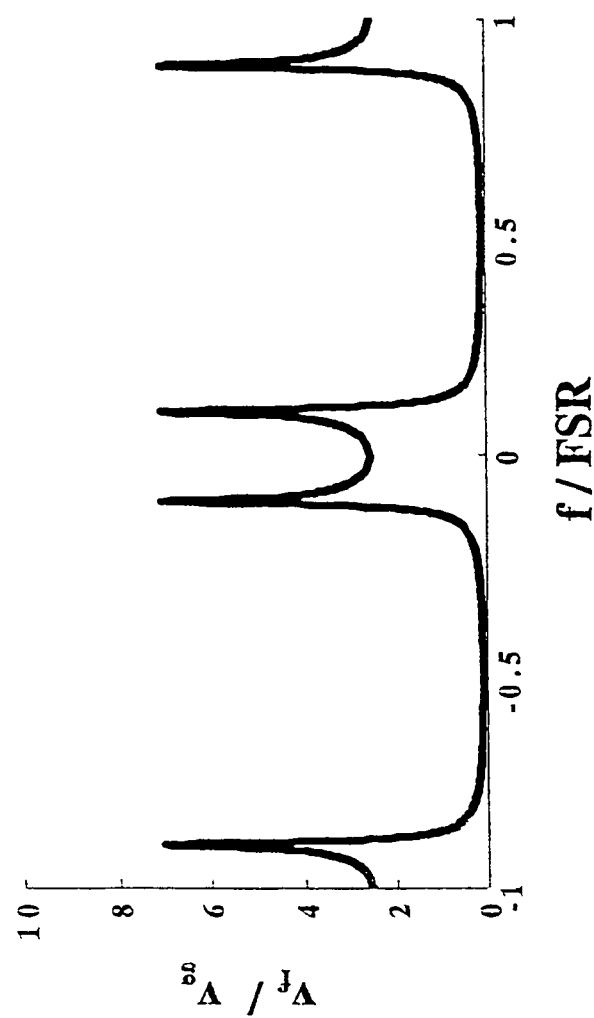

FIG. 17b shows the ratio between the phase velocity and the group velocity versus f/FSR, for the structure of FIG. 16. As shown in FIG. 17b, in band signals are delayed nearly three times compared to signals propagating in a non-resonant structure, in good agreement with theoretical results. As a result a signal whose frequency lies near a resonant frequency $\omega_o$ spends more time travelling through the multiresonator structure 4 than it takes travelling through an equivalent non-resonant waveguide structure of the same physical length $L_f$. Thus, when the FWM wavelength conversion takes place inside the multiresonator structure 4, the interaction time is increased as well as the propagation velocity is reduced. Such enhancement is about 1/t, where t is the inner mirror field transmission coefficient.

FIG. 7 shows a Fabry-Perot like multiresonator structure 4, according to an embodiment of the invention, comprising an optical waveguide 120 wherein a series of equi-spaced partially reflecting mirrors 124 are inserted in order to form a plurality of cascaded optical Fabry-Perot like cavities. The optical length Lo of each cavity (Lo=d*$n_{eff}$, wherein d is the distance between two consecutive mirrors and $n_{eff}$ is the effective refractive index of the material of which the waveguide 120 is made) is of at least 40*λ/2, wherein λ is the wavelength of the pump radiation.

The partially reflecting mirrors 124 can be either concentrated (that is, much shorter than the wavelength in the medium) or distributed (that is, several quarter of wavelengths long). The concentrated reflector can be obtained by means of an abrupt discontinuity between two materials with a strong refractive index difference (for example, metal-glass). The distributed reflector can be achieved by a 1D, 2D or 3D periodical structure. For example, the 1D structure can be made of a conventional Bragg grating.

Figure 8C:
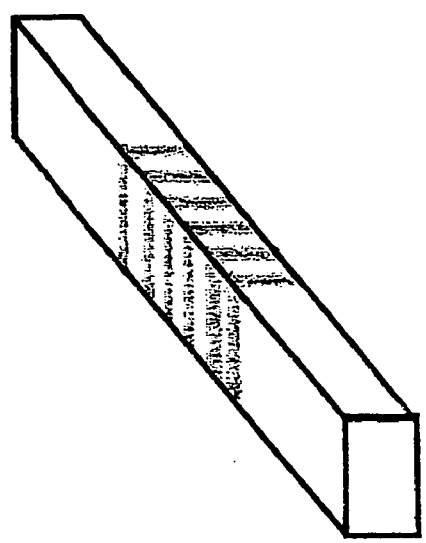
FIG. 8 shows three different ways to spatially modulate the refractive index of an optical waveguide in order to form distributed partially reflecting mirrors.
Figure 8B:
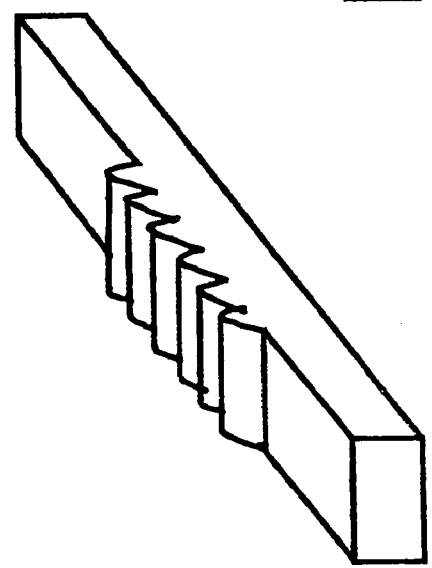
Figure 8A:
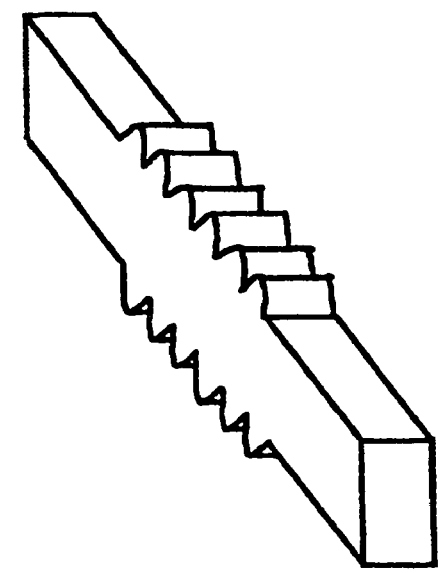

As well known in the art, forward and backward waveguide-mode-coupling are induced in a Bragg grating by periodically varying the effective refractive index $n_{eff}$. Said periodical variation may be achieved by spatially modulating the $n_{eff}$. For example, a lateral corrugation (FIG. 8a) or an upper corrugation (FIG. 8b)—induced by periodically etching the optical waveguide spatial profile—can be used. In fact, such periodical change in the waveguide width leads to a periodic longitudinal modulation of the $n_{eff}$. Otherwise a direct periodical variation of $n_{eff}$ can be induced by the exposure of a photosensitive medium in a pattern of diffracted UV light (FIG. 8c). The structures of FIG. 8 may be suitably combined and other methods to perform periodical variation of $n_{eff}$ may also be used.

The Bragg gratings may be of the chirped type. This allows a broader reflectivity band to be achieved.

The Bragg gratings may be of the apodized type.

As already disclosed above, wavelength conversion may be performed using degenerate four wave mixing process in the non-linear medium of the waveguide 120. Input into the structure 4 are the pump radiation at frequency $\omega_p$ and the signal radiation at frequency $\omega_s$. The pump frequency $\omega_p$ and the signal frequency $\omega_s$ are tuned as close as possible to a resonance mode of the cascaded optical resonators, preferably as close as possible to the center of the resonance mode. As the radiation propagates inside the non-linear medium, a converted radiation is generated within the structure 4 by FWM between the pump radiation and the signal radiation. The frequency of the converted optical radiation is $\omega_c=2\omega_p+\omega_s$ or $\omega_c=2\omega_p-\omega_s$. Then, the pump, signal and converted radiation leave the structure 4 as shown in FIG. 7.

In FIG. 7 wherein the pump and signal radiation travel in the same direction, forward FWM is performed. However, in general, backward FWM can also be performed, wherein the pump and signal radiation propagate through the structure 4 in the opposite direction.

In one particular embodiment of the structure 4 of FIG. 7, the structure 4 comprises eleven semiconductor Fabry-Perot like resonators obtained by inserting in a $Al_{0.2}GaAs_{0.8}$ waveguide twelve equi-spaced partially reflecting mirrors.

The seven inner mirrors have a power reflectivity of about 0.97, the first and the last impedance matching mirrors have a power reflectivity of about 0.55 while the second and the last but one impedance matching mirrors have a power reflectivity of about 0.94. This mirror reflectivity profile performs a Chebyshev-like multiresonator structure with a bandwidth B of 20 GHz and FRS of 200 GHz. Due to phase mismatch, the maximum frequency detuning Δf is preferably of 2 THz. The waveguide has an effective refractive index $n_{eff}$ of 3.3. Each cavity has a physical length d of 217 μm and, neglecting reflector thickness, the whole structure has a physical length of about 2.39 nm. The waveguide has an effective area $A_{eff}$ of 10 μm². A continuous 100 mW pump radiation is tuned at one resonant mode of the structure ($f_p$=196 THz). A modulated 10 mW signal radiation has a frequency $f_s$ tuned at another resonant mode of the structure ($f_s$=194 THz) and is 2 THz shifted with respect to the pump radiation, according to the case shown in FIG. 2a. The pump and signal radiation co-propagate through the structure 4 and both enter the device 100 from the input 1. A third converted wave is generated by FWM at frequency $f_c$ ($f_c$=198 THz). No significant power is backward reflected thanks to a 20 dB in band return loss of the structure. The converted optical power $P_{c,mrs}$ is 5.9 μW (about −22 dBm, corresponding to the point A of FIG. 6). By using Eq. 4 and 5, more than 22 dB gain G is obtained compared to a 2.39 mm non-resonant waveguide structure.

According to further embodiments of the present invention, in the structure 4 a different number of cavities as well as different substrates may be used.

Figure 9:
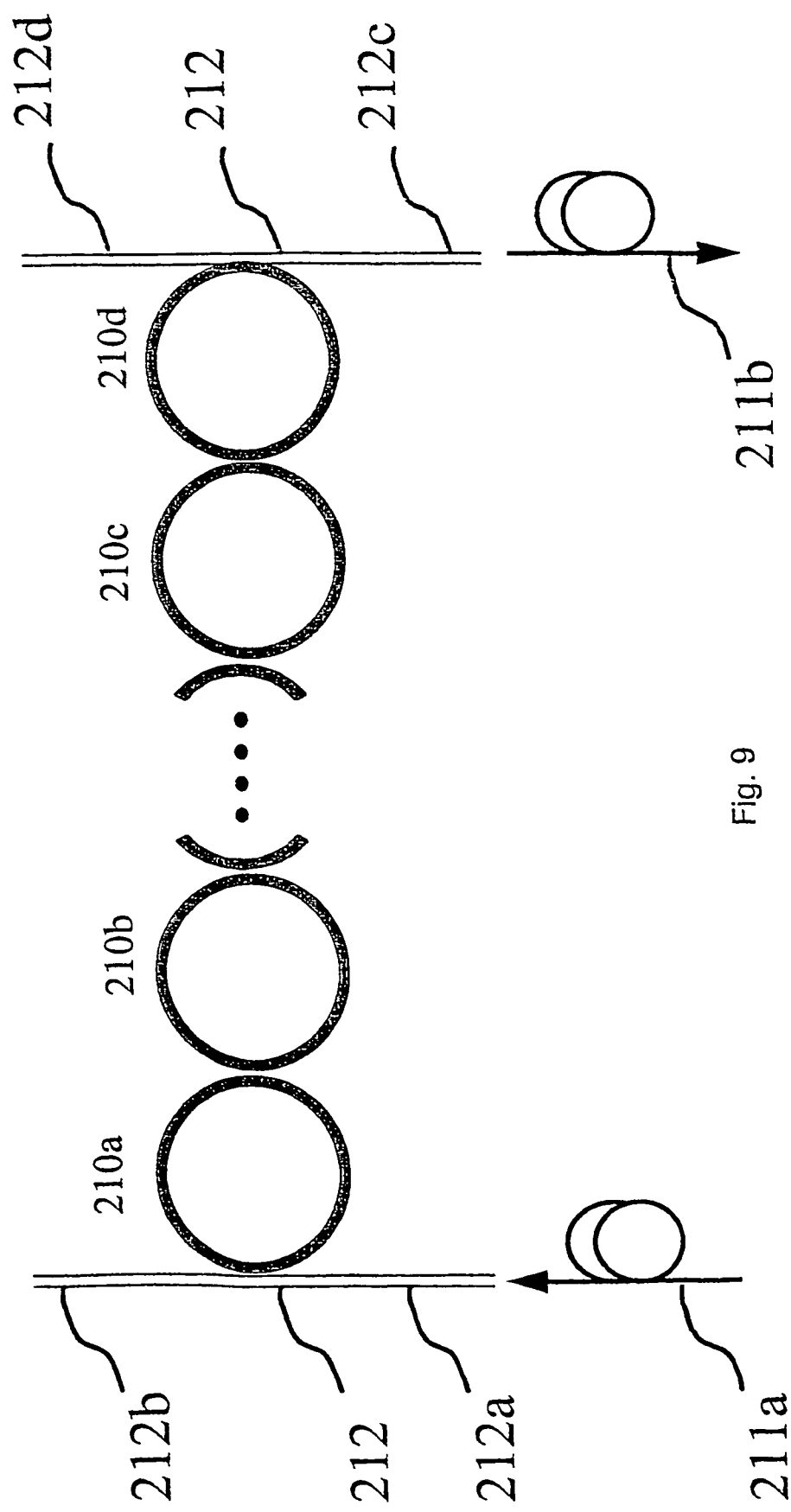
FIG. 9 shows a schematic view of a microring like multiresonator structure according to a further embodiment of the invention.

FIG. 9 shows another embodiment of the invention according to which the structure 4 comprises a plurality of direct-coupled optical microring resonators 210.

Optical microring resonators 210 are directly coupled to each other and to input/output waveguides 212. According to the above mentioned article by A. Melloni et al. ("Synthesis of direct-coupled resonators bandpass filters for WDM systems", Journal of Lightwave Technol., Vol. 20, No. 2, February 2002, pages 296-303), the transfer function of this structure is the same as a Fabry-Perot like multiresonator structure. Thus, the previously explained theory holds also in this case. A microring differs from a Fabry-Perot cavity only for having the forward and backward input/outputs ports 212 all physically distinct (with the consequent advantage that the reflected radiation is separated from the incoming radiation thereby avoiding the use of circulators or isolators). The pump and signal radiation are supplied by an optical fiber 211a to the input port 212a. If the frequencies of the pump and signal radiation are launched into the structure at two resonant frequencies of the resonators, both radiation are coupled from input waveguide 212 to the first ring 210a, from the first ring 210a to the second ring 210b and so on towards the output ports 212c and 212d. The pump and signal radiation are coupled to port 212c if N is odd while to port 212d if N is even, where N is the number of cascaded microrings. Port 212b is the uncoupled output port for out of resonance input radiation.

For a cascaded microring resonator structure, the optical length of the resonator is defined as $n_{eff}*\pi r$, wherein $n_{eff}$ is the effective refractive index of the material of which the structure is made of and r is the microring radius.

Figure 10:
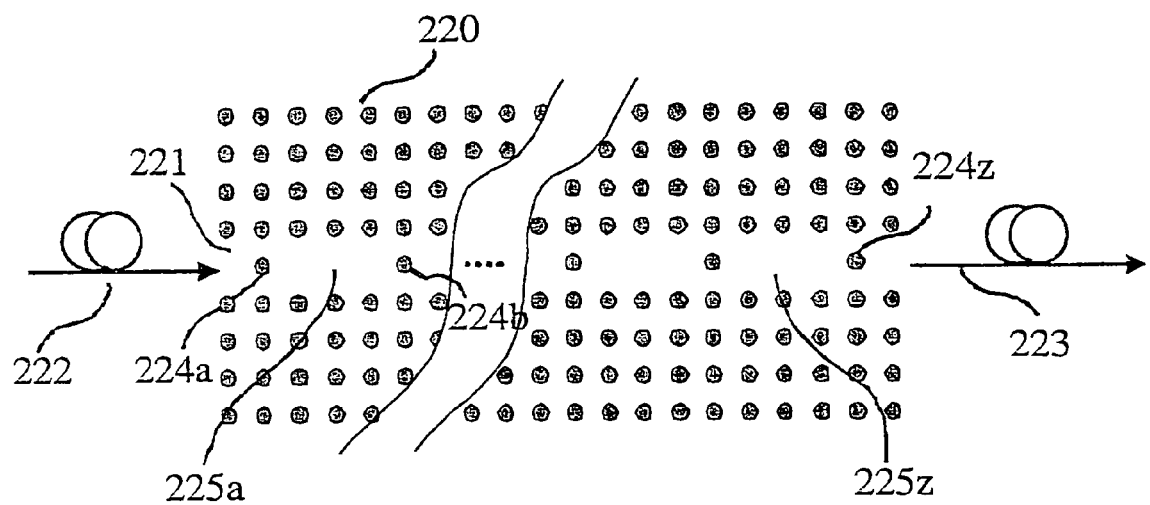
FIG. 10 shows a schematic view of a photonic band gap like structure according to a further embodiment of the invention.

FIG. 10 shows another embodiment of the invention according to which the structure 4 comprises a photonic crystal waveguide 221. The photonic crystal waveguide 221 is obtained eliminating one or more row of defects in a two-dimensional (2D) or three-dimensional (3D) photonic crystal lattice 220. Clearly, only the frequencies within the photonic bands are allowed to propagate through the waveguide. In FIG. 10, a 2D square lattice is shown even if different and more sophisticated lattices such as the hexagonal lattice can be used.

Single or multiple defects (224a to 224z) act as partially reflecting mirror so as to form cascaded cavities 225a to 225z. The power reflectivity of the mirrors depends on the dimension of the defects themselves. The transfer function of such a structure is the same as a Fabry-Perot like multiresonator structure. Thus, the previously explained theory holds also in this case. The pump and the signal radiation are supplied by an input optical fiber 222 to an input port of the waveguide 221. If the frequencies of the pump and signal radiation are launched into the structure at two resonant frequencies of the resonators, both radiation propagate towards an output port of the waveguide 221. As in the Fabry-Perot like multicavity shown in FIG. 7, also in this embodiment the forward and backward input/outputs ports are not physically distinct. Pump, signal and converted output radiation can be collected using an optical fiber 223.

Figure 11:
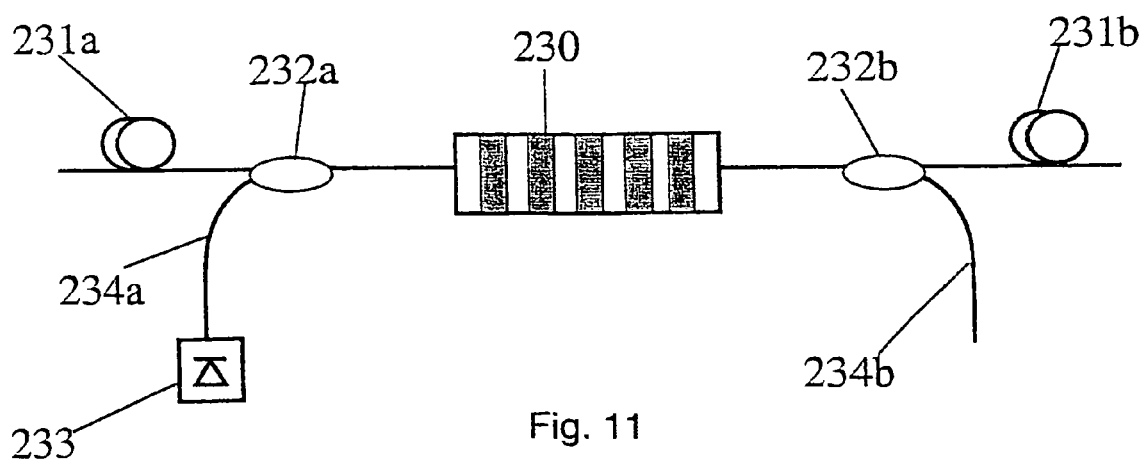
FIG. 11 shows a schematic view of a Fabry-Perot like structure in which an active medium is used according to a further embodiment of the invention.

FIG. 11 shows another embodiment of the invention according to which the structure 4 comprises a plurality of cascaded Fabry-Perot like cavities formed in a rare-earth doped bulk medium or a rare-earth doped waveguide 230 (e.g. erbium doped). A pumping light beam tuned within the active medium absorption band leads to a stimulated emission amplification of a general signal travelling through such structure. When the pump and signal radiation involved in the FWM process fall into the active medium gain band, the wavelength conversion process is further enhanced (as explained, for example, by EP 0 981 189). A laser source 233 is used as pumping light beam for the active medium. Such pumping light beam is preferably tuned far away from the reflectivity band of the mirrors of the cavities (for example far away from the Bragg grating band) so that it does not experience the resonator-like propagation. The pumping light beam is coupled to an input optical fiber 231a by an optical coupler 232a and an optical fiber pigtail 234a, while a second optical coupler 232b is used to extract the pumping light beam from an output optical fiber 231b at the exit of the structure 4.

The Applicant notes that, although in the device 100 the maximum number of resonators is limited by the phase mismatch (see Eq. 9), the converted optical power $P_{c,mrs}$ can be further increased with a multistage device 100 according to another embodiment of the invention.

Figure 1B:
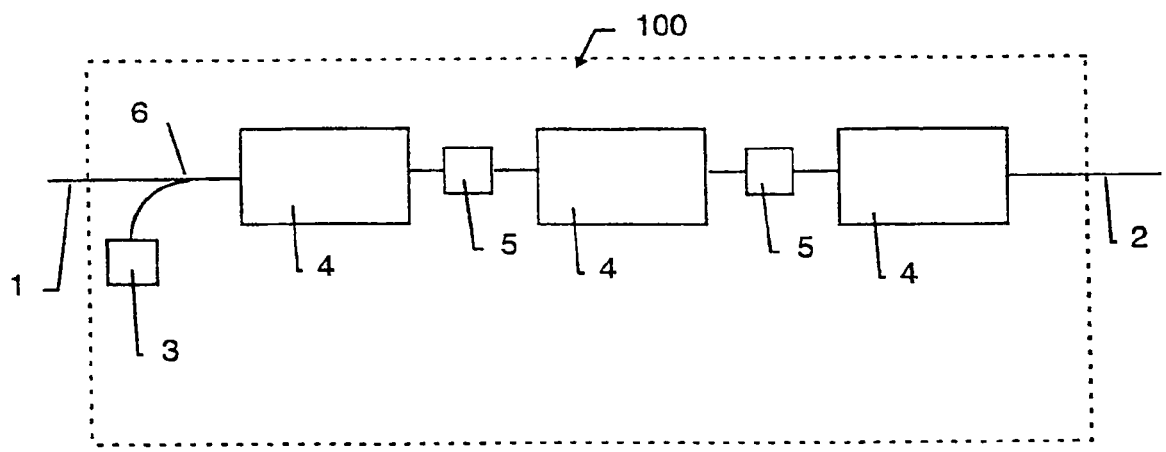

The multistage device 100 comprises an input 1, an output 2, a pump light source 3, an optical coupler 6, a plurality of cascaded multiresonator structures 4 and a plurality of phase mismatch compensating elements 5 interspersed with the structures 4 as shown in FIG. 1b.

As to the features of the input 1, the output 2, the pump light source 3, the optical coupler 6, each multiresonator structure 4, reference is made to what already disclosed above.

The phase mismatch compensating elements 5 are adapted to compensate for the phase mismatch between the pump and signal radiation at the exit of each structure 4.

The pump, signal and generated radiation which leave the first structure out of phase, propagate through the first phase mismatch compensating element without non-linear interaction, enter the second structure with the opportune relative phase, and so on till the last structure. The compensating element is preferably made of a linear material so as to prevent FWM from taking place. In fact, any non-linear interaction would transfer power back from the converted radiation to the pump radiation thereby reducing wavelength conversion efficiency.

According to Eq. 5, by doubling the distance z, and hence the number N of resonators, the output converted optical power is increased of 6 dB. Thus, each additional structure 4 implies an output converted optical power increase of 6 dB (by suitably selecting the optical power of the pump radiation).

Figure 12:
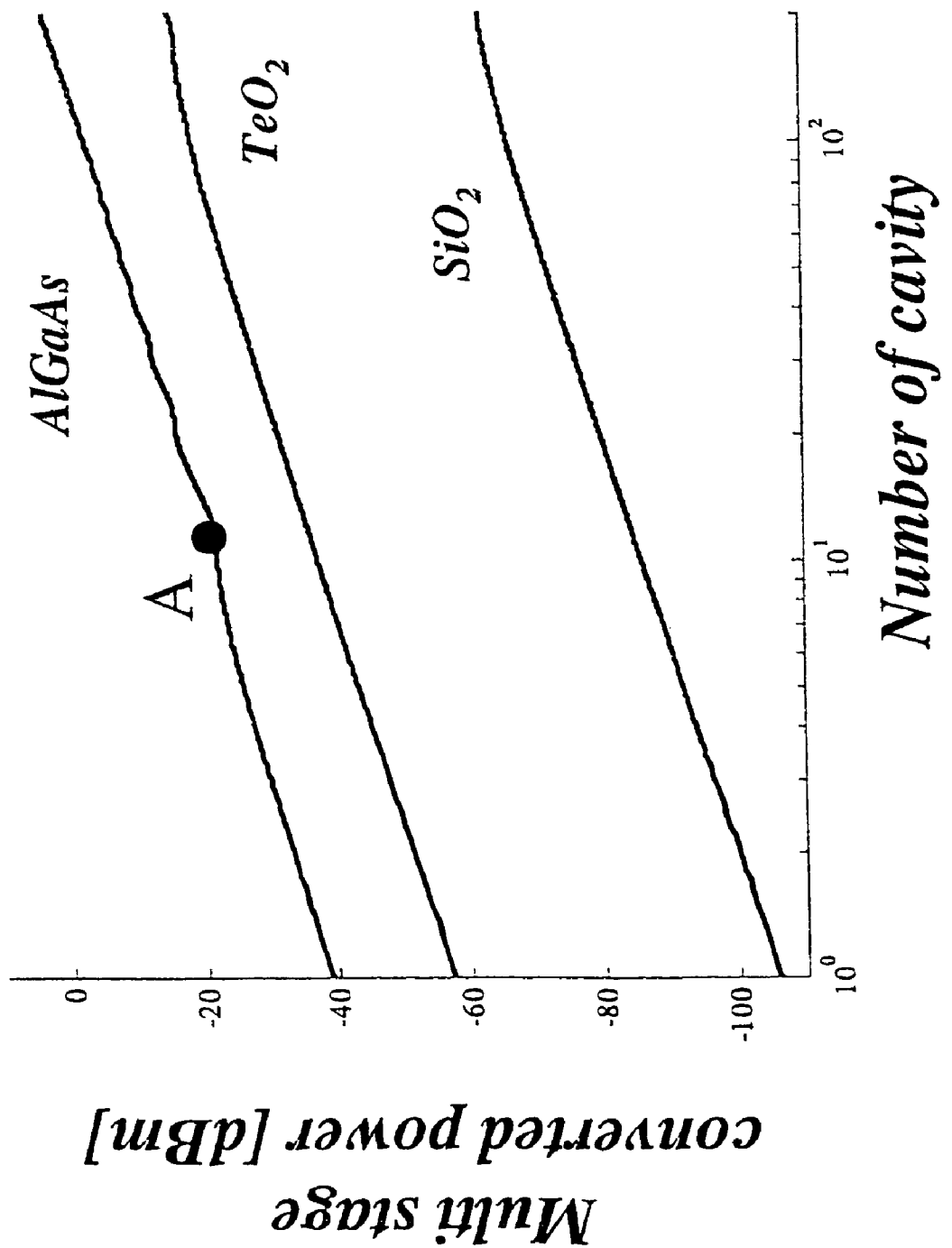
FIG. 12 shows a plot of the maximum converted optical power, which can be achieved using a multistage device of the invention, for different non-linear media.

FIG. 12 shows the performance of a multistage device 100. With reference to each material, each structure is equal to the one described with reference to FIG. 6. For example, in a AlGaAs multistage device a phase mismatch compensating element is preferably used after 11 resonators. In one embodiment, a 220 resonator AlGaAs multistage device preferably comprises 20 structures alternated with suitable designed phase mismatch compensating elements. In FIG. 12 the point A is marked to compare the performance of a multistage device with respect to the single stage AlGaAs device disclosed with reference to FIG. 6.

The phase mismatch compensating element can be designed taking into account the following considerations.

Let $\Delta\phi$ be the phase mismatch accumulated between the pump and signal radiation at the exit of each structure. Using Eq. 10, the general expression for $\Delta\phi$ may be expressed as $$\Delta \phi \approx \frac{\Delta k L}{t} \approx \beta_2 (2\pi \Delta F)^2 \frac{L}{t} \quad (13)$$

where $\beta_2$ is the second order dispersion coefficient (at the pump radiation frequency) of the material the structure is made of and L is the physical length of the structure itself (wherein L may be less than or equal to $L_{coh}$). If the wavelength converter device is used in a WDM communication system, not all WDM channels experience the same phase mismatch. In fact, the higher the detuning $\Delta F$ from the pump wave, the greater the phase mismatch $\Delta \phi$. Thus, the phase mismatch compensating element should introduce a frequency dependent compensating term $\Delta \hat{\phi}$ that satisfies the condition $$\Delta \phi + \Delta \hat{\phi} = 2M\pi \quad (14)$$

where M is an integer.

Different approaches may be followed in order to achieve a compensating element. For instance, a linear element made of a material having a $\hat{\beta}$ opposite in sign with respect to $\beta_2$ may be used. If $\hat{L}$ is the physical length of such a phase mismatch compensating element, the phase term introduced is $\Delta \hat{\phi} = \hat{\beta}_2 (2\pi \Delta F)^2 \hat{L}$. Since the sign of $\Delta \hat{\phi}$ is opposite to the sign of $\Delta \phi$, we will refer to it as backward rephasing. Substituting the expressions of $\Delta \phi$ and $\Delta \hat{\phi}$ into Eq. (14), we obtain the length $\hat{L}$ of the compensating device $$\hat{L} = \left| \frac{\beta_2}{\hat{\beta}_2} \right| \frac{L}{t} \quad (15)$$

It should be noted that in the case of backward rephasing the physical length $\hat{L}$ of the phase mismatch compensating element does not depend on the frequency detuning $\Delta F$. This result derives from the fact that in the case of backward rephasing Eq. 14 admits a solution for M=0. It follows that one compensating element is enough to rephase all the WDM channels exiting from a multiresonator structure and the multistage device may be designed to wavelength convert a plurality of WDM optical channels.

Also, a phase mismatch compensating element made of a material having a $\hat{\beta}$ with the same sign as $\beta_2$ may be used. If $\hat{L}$ is the physical length of such a phase mismatch compensating element, the phase term introduced is $\Delta \hat{\phi} = \hat{\beta}_2 (2\pi \Delta F)^2 \hat{L}$. Since in this case the phase mismatch compensating element adds a further frequency dependent dephasing term of the same sign as $\Delta \phi$, we will refer to it as forward rephasing. When the total dephasing reaches a multiple of $2\pi$, the pump, signal and generated radiation return to be in phase again and may enter the following structure of the multistage device. From Eq. 14 the length $\hat{L}$ of the compensating device is achieved:

$$\hat{L}(\Delta F) = \frac{2M\pi - \Delta \phi(\Delta F)}{\hat{\beta}_2 (2\pi \Delta F)^2 \hat{L}} \quad (16)$$

where $\Delta \phi(\Delta F)$ is the phase mismatch at the exit of each structure, according to Eq. 13. It should be noted that in this case the length $\hat{L}$ of the compensating device always depends on the detuning $\Delta F$. In fact, Eq. (14) does not admit a solution for M=0 and consequently, once $\hat{L}$ is chosen, forward rephasing works only at a fixed detuning $\Delta F$. Therefore a multistage device with forward rephasing compensating elements operates an efficient wavelength conversion only for one WDM channel spaced $\Delta F$ from the pump radiation. If more than one WDM channel has to be compensated, backward rephasing is preferred and consequently different materials have to be used for the structures and the compensating elements.

Figure 13:
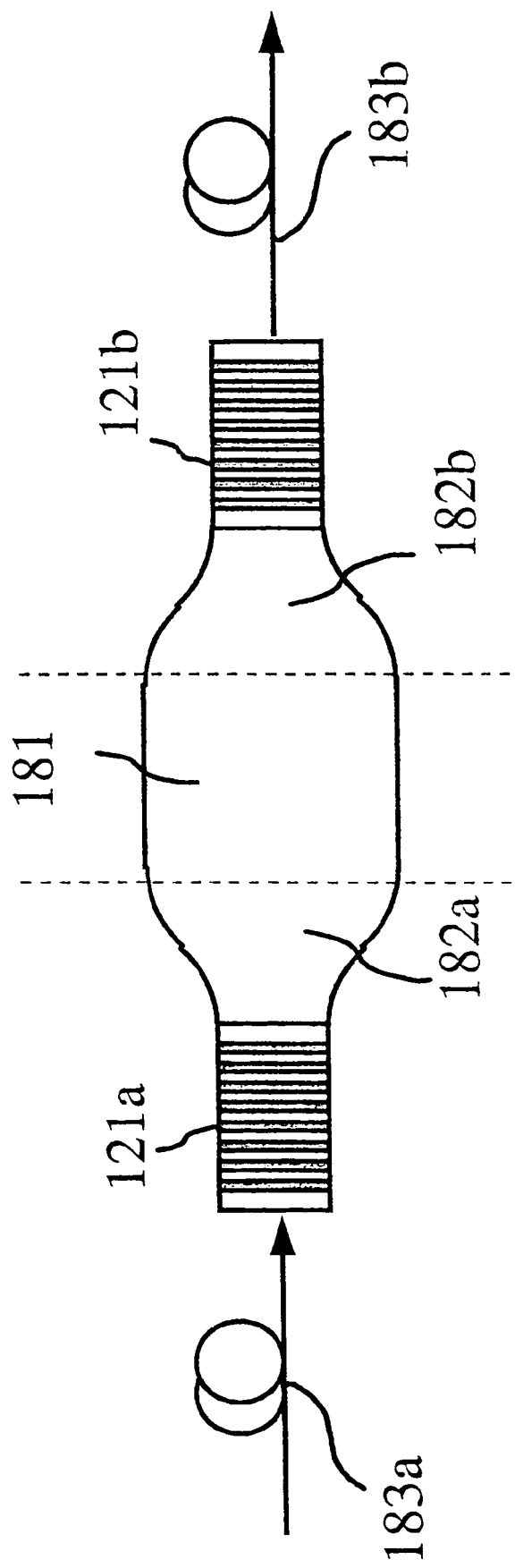
FIG. 13 shows a schematic view of a multistage device according to an embodiment of the invention.

FIG. 13 shows an embodiment of a multistage device 100 of the invention comprising two structures 121a and 121b and a phase mismatch compensating element 181 inserted between the two structures 121a, 121b. The phase mismatch compensating element 181 is a dielectric optical waveguide. Such waveguide may be made of the same material as the structures 121a, 121b (forward rephasing), or of a different material (forward or backward rephasing depending on the signs of $\beta_2$ and $\hat{\beta}$). As shown in FIG. 13, the compensating waveguide 181 is wider than the waveguides of the structures. This allows non-linear field interactions to be prevented because the non-linear coefficient $\gamma$ decreases with an increasing waveguide effective area $A_{eff}$. A further reduction of the non-linear coefficient $\gamma$ (and, thus, of the non-linear field interactions) may be achieved by suitably selecting a material having a non-linear refractive index n2 lower than the non-linear refractive index n2 of the material of the structures 121a, 121b.

As the widening of the waveguide transversal dimension may excite higher order modes, the multistage device 100 of FIG. 13 preferably further comprises tapered input and output transition sections 182a, 182b. These sections are designed according to conventional techniques so as to obtain an adiabatic transition and reduced power losses.

Pump and signal radiation are supplied to the multistage device 100 from an input optical fiber 183a and, after propagating through the first non linear structure 121a, enter the phase mismatch compensating element 181 passing through the input tapered section 182a. After propagating through the phase mismatch compensating element 181, they enter the second non linear structure 121b passing through the output tapered section 182b. Then, pump, signal and converted radiation leave the structure 121b through an output optical fiber 183b. An optical filter (not shown) will suppress any residual pump and signal radiation.

The lengths of the waveguide 181 and of the input and output tapered sections 182a, 182b are adjusted according to Eq. 15 or Eq. 16 in order to obtain the desired relative phase between the pump and signal radiation at the beginning of the second structure 121b.

For example, referring to the structure made of $Al_{0.2}GaAs_{0.8}$ described above with reference to FIG. 7—whose second order dispersion coefficient $\beta_2$ is positive ($\beta_2 \sim 1240$ $ps^2/Km$ at 1530 nm)—the compensating waveguide 181 may be made of $Al_{0.2}GaAs_{0.8}$ thereby obtaining a forward rephasing compensating element. Using Eq. 16, the length $\hat{L}$ of such a compensating waveguide 181 is about 18 mm for a detuning $\Delta F=2$ THz. Alternatively, the compensating waveguide 181 may be made of a material having a negative value of $\beta_2$, such as $SiO_2$ ($\beta_2 \sim -25$ $ps^2/Km$ at 1530 nm) so as to obtain a backward rephasing compensating element.

Figure 18:
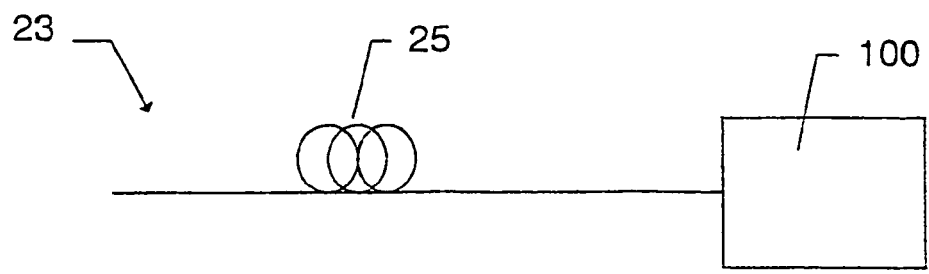
FIG. 18 shows a schematic view of an optical communication line according to an embodiment of the invention.

Even if FIG. 18 shows a two stage device 100 with two structures 121a, 121b and one compensating element 181, a different number of structures and compensating elements may be employed.

Figure 14:
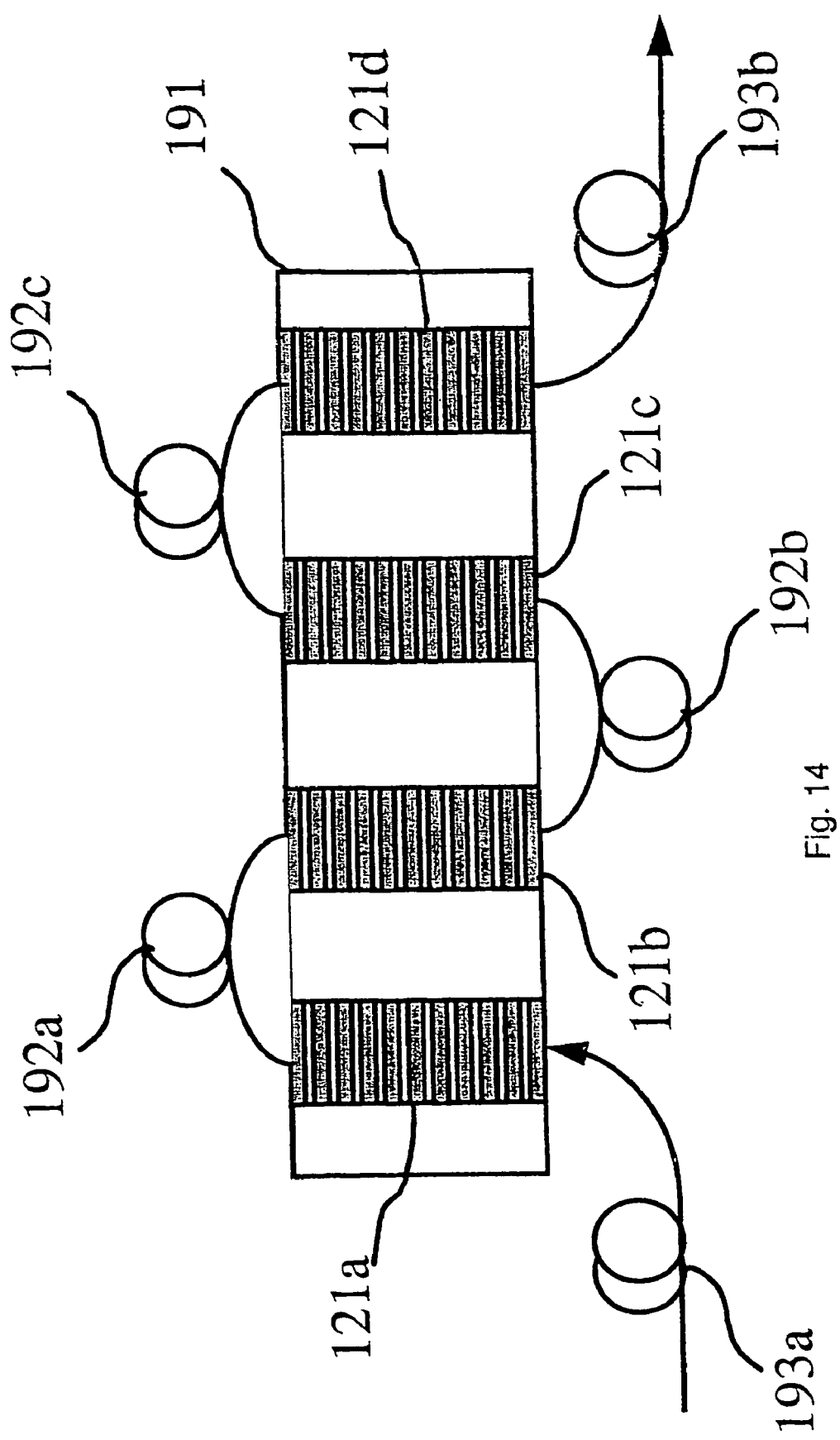
FIG. 14 shows a schematic view of a multistage device according to a further embodiment of the invention.

FIG. 14 shows a further embodiment of a multistage device 100 of the invention comprising four structures 121a to 121*d* arranged in parallel in a substrate 191 and three phase mismatch compensating elements 192*a* to 192*c* inserted in series between one structure and the other. In this embodiment the four structures 121*a* to 121*d* are made of $Al_{0.2}GaAs_{0.8}$ while compensating elements 192*a* to 192*c* consist each of a $SiO_2$ optical fiber (backward rephasing). Pump and signal radiation may be supplied to the device 100 through an input optical fiber 193*a*, propagate through the structure 121*a* from the front facet to the back facet, enter the phase mismatch compensating fiber 192*a*, hence propagate through the second structure 121*b* from the back facet to the front facet and so on. Finally pump, signal and converted radiation leave the multistage device 100 through an output optical fiber 193*b*. The length of each fiber 192 is adjusted according to Eq. 15 in order to obtain the desired relative phase between the pump and signal radiation at the beginning of each structure 121. Because of the small absolute value of $\beta_2$ in $SiO_2$ with respect to $Al_{0.2}GaAs_{0.8}$, the length $\hat{L}$ of each compensating fiber 192 is about 66.2 cm, while the length L of each structure 121 is about 2.39 mm.

In order to reduce the length $\hat{L}$ of the compensating elements 192, highly dispersive $SiO_2$ optical fibers as well as optical fibers made of other materials may be used. Moreover, when the structures 121 are made of a material with a negative second order dispersion coefficient $\beta_2$, compensating fibers 192 made of a material having a positive value of $\beta_2$ may be used to perform backward rephasing.

Figure 15:
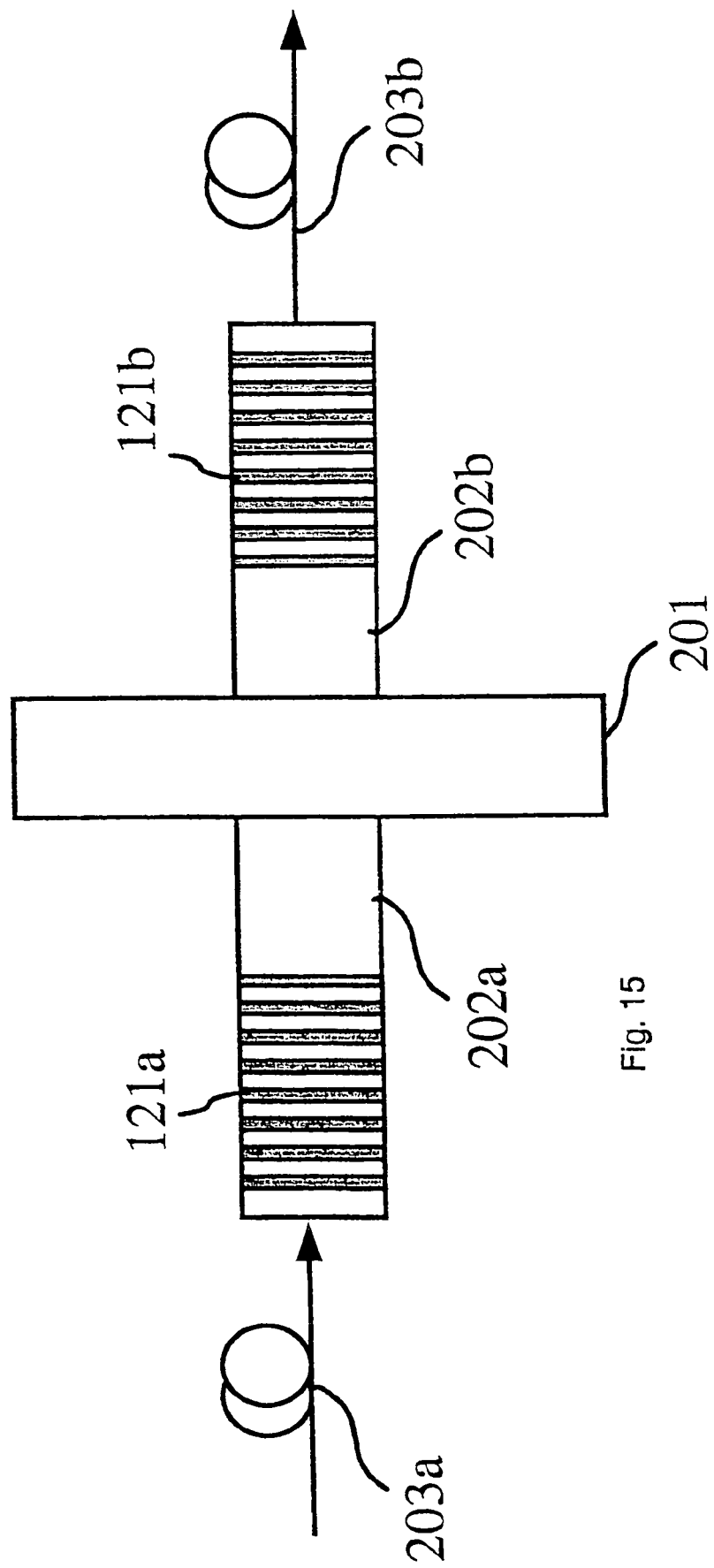
FIG. 15 shows a schematic view of a multistage device according to a further embodiment of the invention.

FIG. 15 shows a further embodiment of a multistage device 100 of the invention comprising two structures 121*a*, 121*b* and one phase mismatch compensating element consisting of a dispersive plate 201 inserted between two structures 121*a*, 121*b*. An input optical waveguide 202*a* and an output optical waveguide 202*b* may be introduced between the dispersive plate 201 and each structure 121*a*, 121*b* for improving the manufacturing (lapping and cut) process. The dispersive plate 201 and the length of each optical waveguide 202*a*, 202*b* are adjusted in order to obtain the desired relative phase between the pump and signal radiation at the beginning of the second structure 121*b*. Pump and signal radiation are supplied to the device 100 through an input optical fiber 203*a*. Another optical fiber 203*b* is used as output port for pump, signal and converted radiation.

A dispersive plate is a plate having high chromatic dispersion value with respect to the non-linear material of the structures 121*a*, 121*b*. Preferably, it has chromatic dispersion value ten times higher.

Of course, even if FIG. 15 shows a two stage device, a different number of cascaded structures and dispersive plates may be employed.

The wavelength converter device of the invention can be used for avoiding a conflict of wavelengths in a node of a WDM optical network wherein signals at different wavelengths are routed towards other nodes of the network (S. J. B. Yoo, "*Wavelength conversion technologies for WDM network applications*", Journal of Lightwave Technology, Vol. 14, No. 6, June 1996, pages 955-966). In fact, in such a node it may occur that two signals having the same wavelength (or frequency) have to be routed towards the same output and that a device suitable to convert the wavelength of one of the two signals into another wavelength, before routing the two signals towards the same node output, is required.

Moreover, since the converted radiation is the phase conjugated of the signal radiation and falls into the symmetrical resonance mode with respect to the pump resonance (see FIG. 2), the wavelength converter device of the invention can also be used as spectral inverter of a signal radiation with respect to a pump radiation.

For example, such spectral inverter can be used for compensating the chromatic dispersion of a signal or of a grid of WDM signals in an optical communication line or system. In the case of a grid of WDM signals, the spacing in frequency of the grid of WDM signals must be substantially equal to the free spectral range of the wavelength converter device or to an integer multiple thereof.

Even if the wavelength converter device of the invention has been disclosed with reference to the wavelength conversion through degenerate FWM process, it is clear that it can also be suitably designed to perform wavelength conversion through non-degenerate FWM process or any another of the above mentioned parametric processes.

Furthermore, the device of the invention, can also be used to alter (e.g. to broaden) the optical spectrum of a signal radiation propagating through it according to the well known self-phase modulation (SPM) or cross-phase modulation (XPM) non-linear phenomena.

More in particular, SPM refers to the self-induced phase shift experienced by an optical field during its propagation in a non-linear medium. Among other things, SPM is responsible for spectral broadening of ultrashort pulses and the existence of optical solitons in the anomalous-dispersion regime of the non-linear medium. On the contrary, the XPM refers to the non-linear phase shift of an optical field induced by a copropagating field at different wavelength. Among other things, XPM is responsible for spectral broadening of copropagating optical pulses (see G. P. Agrawal, "Nonlinear fiber optics", 2nd edition, Academic Press, 1995, page 17).

FIG. 18 shows an optical communication line 23 according to the invention, comprising an optical cable including a transmission fibre length 25 and a device 100 according to the invention.

The optical transmission fibre length 25 is a portion of optical fibre conventionally used for optical communications. Typically, it is a portion of single-mode optical fibre at the wavelengths of interest.

The optical communication line 23 can be used either in a long distance transmission system or in distribution networks such as, for example, access networks.

According to the applications, the optical communication line 23 may also comprise an optical amplifier (not shown).

For example, the optical amplifier is of the conventional type and it comprises a portion of erbium-doped active optical fibre and a pump source (for example, a laser source) for pumping the active optical fibre at a pumping wavelength. Typical example of pumping wavelengths for an erbium-doped active optical fibre are about 980 and 1480 nm.

Moreover, the optical amplifier can optionally comprise more than one optical amplification stages.

According to an embodiment not shown, the optical communication line 23 of the invention comprises a plurality of optical transmission fibre lengths 25, a plurality of optical amplifiers interposed between a length and the other of optical transmission fibre 25 and at least one wavelength converter device according to the invention (designed, for example, for compensating at least partly the chromatic dispersion of the plurality of optical transmission fibre lengths 25).

In general, the device of the invention can be arranged at the beginning, at the end or within the optical communication line 23. For example, in the case of application as spectral inverter, it can be inserted in the middle of the optical transmission fibre length 25 as described by M. H.

Chou ("*Efficient wide-band and tunable midspan spectral inverter using cascaded nonlinearities in LiNbO₃ waveguides*", IEEE Photonics Technology Letters, Vol. 12, No. 1, January 2000, pages 82-84).

Figure 19:
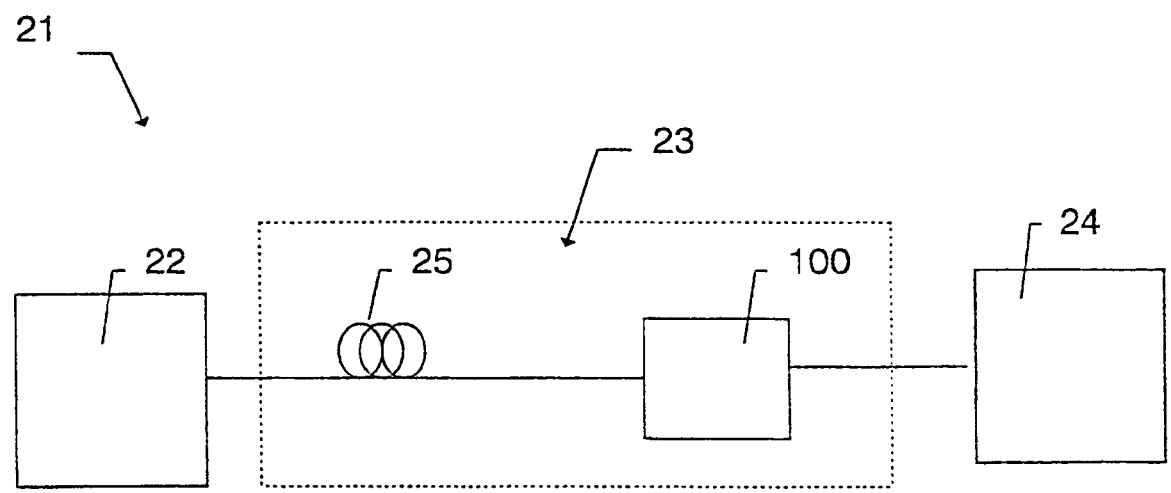
FIG. 19 shows a schematic view of an optical communication system according to an embodiment of the invention.

FIG. 19 shows an optical communication system 21 according to the invention, comprising a transmitting station 22 for providing an optical signal radiation at a frequency $\omega_s$, a receiving station 24 for receiving an optical signal radiation, and an optical communication line 23 for transmitting the optical signal radiation.

According to a preferred embodiment, the optical communication system 21 is a WDM system.

In this case, the transmitting station 22 is a conventional WDM equipment suitable to provide N optical signals having wavelengths λ1, λ2 ... λN differing from one another (corresponding to frequencies $\omega_{s1}, \omega_{s2} \ldots \omega_{sN}$, to wavelength multiplex them and to send them in the optical communication line 23.

Preferably, the transmitting station 22 also comprises an optical power amplifier (booster, not shown) for amplifying the WDM optical signal before sending it along the line 23 (or a certain number of optical power amplifiers in parallel for amplifying optical signals comprised in different wavelength bands).

Such wavelengths λ1, λ2 ... N are typically selected into a range of wavelengths comprised between about 1450 nm and 1650 nm.

Typically, the N optical signals are modulated signals, for example at 100 Mbit/s, 1 Gbit/s, 2.5 Gbit/s, 10 Gbit/s, 20 Gbit/s, 40 Gbit/s or 80 Gbit/s. Furthermore, the N optical signals are typically frequency spaced by 12.5, 25, 50, 100 or 200 GHz.

The receiving station 24 comprises a conventional equipment suitable to demultiplex a WDM optical signal at its input and to send the demultiplexed optical signals to optional further processing stages. Moreover, said receiving station 24 typically comprises also an optical pre-amplifier (not shown) suitable to bring the WDM optical signal at a suitable power level to be received by the receiving equipment (or a certain number of optical pre-amplifiers in parallel for amplifying the optical signals comprised in different wavelength bands).

According to the applications, the line 23 may also comprise a plurality of conventional optical amplifiers (not shown) for amplifying a signal coming from an upstream portion of the line, in which the signal has attenuated during its propagation along it, and sending it in a downstream portion of the line.

Alternatively, in place of each optical amplifier, the line 23 can comprise a number of optical amplifiers arranged in parallel for amplifying the optical signals comprised in different wavelength bands.

Figure 20:
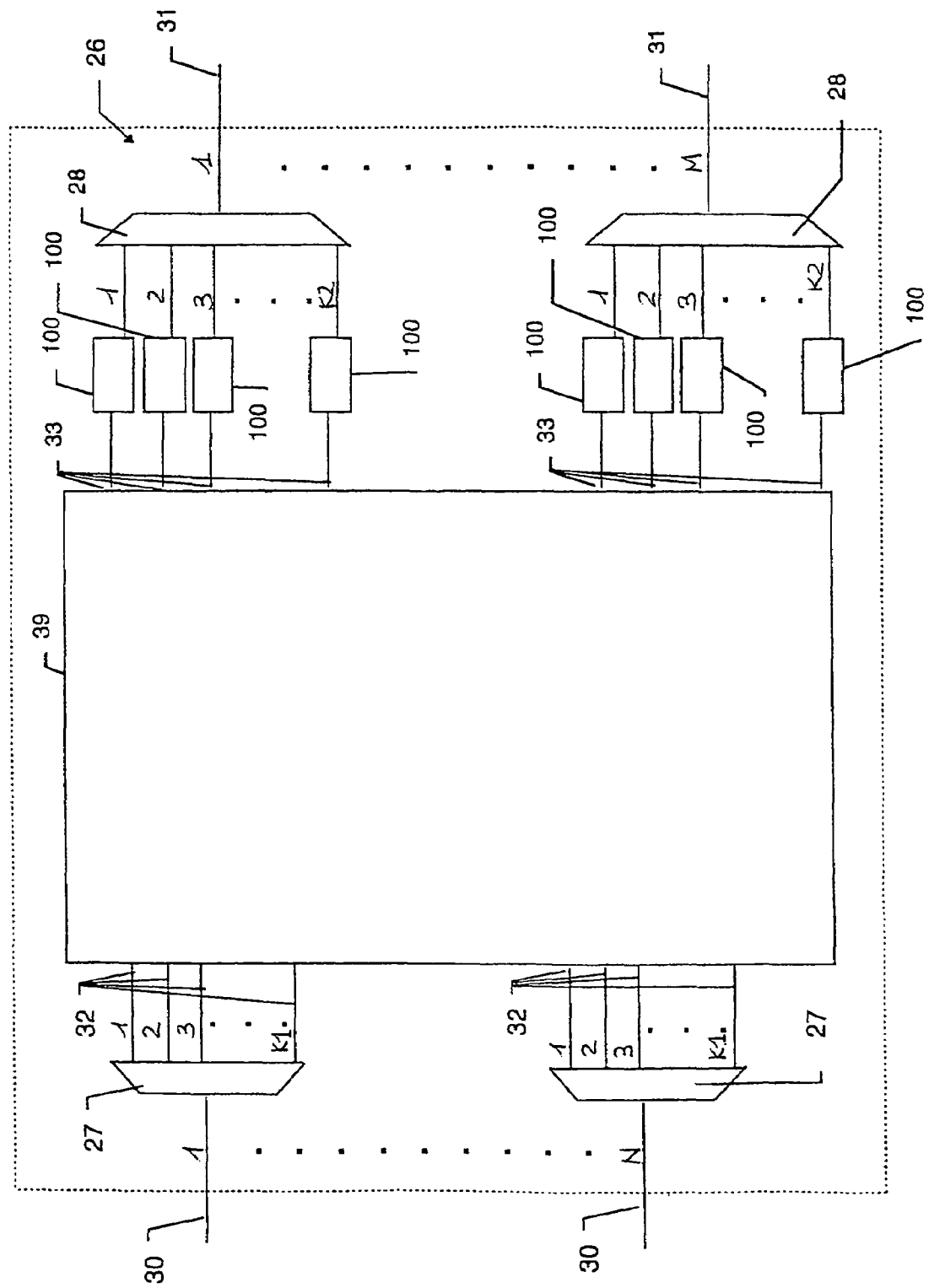
FIG. 20 shows an apparatus for an optical network node according to an embodiment of the invention.

FIG. 20 shows an apparatus 26 for a WDM optical network node according to an embodiment of the invention, comprising a routing element 39, a plurality of wavelength converter devices 100 according to the invention, N input optical fibers 30, M output optical fibers 31, N demultiplexing devices 27 and M multiplexing devices 28, with N, M≧1 and N equal to or different from M.

In the embodiment shown, each input optical fiber 30 is optically connected to a respective 1×K1 demultiplexing device 27, the demultiplexing devices 27 are optically connected to the input ports 32 of the routing element 39, each output port 33 of the routing element 39 is optically connected to a respective wavelength converter device 100, the outputs of the wavelength converter devices 100 are optically connected to M K2×1 multiplexing devices 28 and each multiplexing device 28 is optically connected to a respective output optical fiber 31.

Each input optical fiber 30 carries K1 wavelength multiplexed optical signal radiation. The K1 wavelength multiplexed optical signal radiation are wavelength demultiplexed by the demultiplexing devices 27 and sent to respective input ports 32. The optical signal radiation are then processed by the routing element 39, coupled to respective output ports 33, optionally wavelength converted by the devices 100 and lastly wavelength multiplexed by the multiplexing devices 28 in M output multiplexed optical signal radiation. The M output multiplexed optical signal radiation are then sent to M respective output optical fibers 31.

The apparatus shown is capable of routing any input optical signal radiation to any output optical fiber 31 with any desired wavelength (comprised within the operating wavelengths of the devices 100), thanks to the wavelength converter devices 100.

In the embodiment shown, the routing element 39 has k1×n input ports 32 and k2×M output ports 33, with K1, K2>1 and K1 equal to or different from K2.

According to a variant, the demultiplexing devices 27 may have a number of output ports different from each other. Furthermore, the multiplexing devices 28 may have a number of input ports different from each other.

The routing element may comprise a conventional optical switching matrix, a conventional add-drop device, a conventional cross-connect, a conventional λ-router or a combination thereof.

The optical switching matrix may comprise MEMS (micro-electro-mechanical-systems), thermo-optical, electro-optical or magneto-optical switches which preferably are of the re-configurable type.

The apparatus 26 may be formed by integrated optics, fiber based or MEMS based technology.

The invention claimed is:

1. A wavelength converter device for generating a converted radiation at frequency $\omega_g$ through interaction between at least one signal radiation at frequency $\omega_s$ and at least one pump radiation at frequency $\omega_p$, comprising:

an input for said at least one signal radiation at frequency $\omega_s$;

a pump light source for generating said at least one pump radiation at frequency $\omega_p$;

an output for taking out said converted radiation at frequency $\omega_g$; and a structure for transmitting said signal and pump radiation, said structure including an optical resonator comprising a non-linear material, having an optical length of at least 40*λ/2, wherein λ is the wavelength of the pump radiation, and resonating at the pump, signal and converted frequencies $\omega_p$, $\omega_s$ and $\omega_g$;

said structure comprising a further optical resonator coupled in series to said optical resonator, said further optical resonator comprising a non-linear material, having an optical length of at least 40*λ/2, wherein λ is the wavelength of the pump radiation, and resonating at the pump, signal and converted frequencies $\omega_p$, $\omega_s$ and $\omega_g$, and wherein by propagating through said structure, the pump and signal radiation generate said converted radiation by non-linear interaction within each of said optical resonators.

2. The wavelength converter device according to claim 1, wherein the converted radiation is generated by four-wave-mixing.

3. The wavelength converter device according to claim 1, wherein the optical resonator and the further optical resonator each have an optical length lower than or equal to $7500*\lambda/2$.

4. The wavelength converter device according to claim 1, wherein the optical resonator and the further optical resonator comprise reflectors each having a power reflectivity of at least 0.5.

5. The wavelength converter device according to claim 1, wherein the optical resonator is a Fabry-Perot like cavity bounded by two partially reflecting mirrors.

6. The wavelength converter device according to claim 5, wherein the further optical resonator is a Fabry-Perot like cavity bounded by two partially reflecting mirrors.

7. The wavelength converter device according to claim 1, wherein the optical resonator is a micro-ring-like resonator.

8. The wavelength converter device according to claim 7, wherein the further optical resonator is a micro-ring-like resonator.

9. The wavelength converter device according to claim 1, wherein the optical resonator is formed in a photonic crystal waveguide.

10. The wavelength converter device according to claim 9, wherein the further optical resonator is formed in a photonic crystal waveguide.

11. The wavelength converter device according to claim 1, further comprising an additional structure in series to the structure.

12. The wavelength converter device according to claim 11, further comprising a phase mismatch compensating element adapted to compensate for the phase mismatch accumulated by the pump and signal radiation along the structure.

13. The wavelength converter device according to claim 12, wherein the phase mismatch compensating element is placed between the structure and the additional structure.

14. The wavelength converter device according to claim 12, wherein the phase mismatch compensating element comprises a material having a non-linear refractive index n2 lower than the non-linear refractive index of the material included in the structure and the additional structure.

15. The wavelength converter device according to claim 1, wherein the pump radiation frequency $\omega_p$ and the signal radiation frequency $\omega_s$ are different.

16. The wavelength converter device according to claim 1, wherein the optical resonator and the further optical resonator are connected in series.

17. The wavelength converter device according to claim 1, wherein the optical resonator and the further optical resonator are made of the same material.

18. The wavelength converter device according to claim 1, wherein the optical resonator and the further optical resonator have the same optical length.

19. The wavelength converter device according to claim 1, wherein the optical resonator and the further optical resonator each have a free spectral range equal to or lower than about 4 THz.

20. The wavelength converter device according to claim 1, wherein the optical resonator and the further optical resonator each have a free spectral range equal to or lower than about 1000 GHz.

21. The wavelength converter device according to claim 1, wherein a ratio FSR/B between a free spectral range FSR and a bandwidth B for the optical resonator and the further optical resonator is greater than or equal to 2.

22. The wavelength converter device according to claim 1, wherein a ratio FSR/B between a free spectral range FSR and a bandwidth B for the optical resonator and the further optical resonator is less than or equal to 100.

23. The wavelength converter device according to claim 1, wherein the structure further comprises a third optical resonator cascaded to the further optical resonator, said third optical resonator comprising a non-linear material having an optical length of at least $40*\lambda/2$, wherein $\lambda$ is the wavelength of the pump radiation, and resonating at the pump, signal and converted frequencies $\omega_p$, $\omega_s$ and $\omega_g$, wherein by propagating through said structure the pump and signal radiation generate said converted radiation by non-linear interaction within each of said optical resonator, said further optical resonator and said third optical resonator.

24. The wavelength converter device according to claim 1, wherein the structure comprises a number of cascaded optical resonators less than $N_{max}$, where $N_{max}$ is equal to the ratio between the coherence length $L_{coh}$ of the structure and the physical length d of each of said cascaded optical resonators.

25. A method for generating a radiation at frequency $\omega_g$ comprising: interacting through non-linear interaction at least one pump radiation at frequency $\omega_p$ with at least one signal radiation at frequency $\omega_s$ in a structure comprising a plurality of cascaded optical resonators each comprising a non-linear material resonating at the pump, signal and converted frequencies $\omega_p$, $\omega_s$ and $\omega_g$, and having an optical length of at least $40*\lambda/2$, wherein $\lambda$ is the wavelength of the pump radiation, and wherein through said non-linear interaction the pump and signal radiation generate said converted radiation within each of said plurality of cascaded optical resonators.

26. The method according to claim 25, wherein the radiation at frequency $\omega_g$ is generated by four-wave mixing.

27. An apparatus for an optical network node, comprising:
a routing element with at least one input port and a plurality of output ports for interconnecting each input port with at least one corresponding output port;
at least one wavelength converter device for generating a converted radiation at frequency $\omega_g$ through interaction between at least one signal radiation at frequency $\omega_s$ and at least one pump radiation at frequency $\omega_p$, comprising:
an input for said at least one signal radiation at frequency $\omega_s$;
a pump light source for generating said at least one pump radiation at frequency $\omega_p$;
an output for taking out said converted radiation at frequency $\omega_g$; and
a structure for transmitting said signal and pump radiation, said structure including an optical resonator comprising a non-linear material, having an optical length of at least $40*\lambda/2$, wherein $\lambda$ is the wavelength of the pump radiation, and resonating at the pump, signal and converted frequencies $\omega_p$, $\omega_s$ and $\omega_g$,
said structure comprising a further optical resonator coupled in series to said optical resonator, said further optical resonator comprising a non-linear material, having an optical length of at least $40*\lambda/2$, wherein $\lambda$ is the wavelength of the pump radiation, and resonating at the pump, signal and converted frequencies $\omega_p$, $\omega_s$ and $\omega_g$; wherein by propagating through said structure the pump and signal radiation generate said converted radiation by non-linear interaction within each of said optical resonators, and said at least one wavelength converter device being optically coupled to one of the ports of said routing element.

28. The apparatus for an optical network node according to claim 27, further comprising an additional structure in series to the structure.

29. The apparatus for an optical network node according to claim 28, further comprising a phase mismatch compensating element adapted to compensate for the phase mismatch accumulated by the pump and signal radiation along the structure.

30. An optical communication line comprising an optical transmission path for transmitting at least one signal radiation at frequency $\omega_s$, and a wavelength converter device for generating a converted radiation at frequency $\omega_g$ through interaction between said at least one signal radiation at frequency $\omega_s$ and at least one pump radiation at frequency $\omega_p$, comprising:
- an input for said at least one signal radiation at frequency $\omega_s$;
- a pump light source for generating said at least one pump radiation at frequency $\omega_p$;
- an output for taking out said converted radiation at frequency $\omega_g$; and
- a structure for transmitting said signal and pump radiation, said structure including an optical resonator comprising a non-linear material, having an optical length of at least $40*\lambda/2$, wherein $\lambda$ is the wavelength of the pump radiation, and resonating at the pump, signal and converted frequencies $\omega_p$, $\omega_s$ and $\omega_g$, said structure comprising a further optical resonator coupled in series to said optical resonator, said further optical resonator comprising a non-linear material, having an optical length of at least $40*\lambda/2$, wherein $\lambda$ is the wavelength of the pump radiation, and resonating at the pump, signal and converted frequencies $\omega_p$, $\omega_s$ and $\omega_g$; wherein by propagating through said structure the pump and signal radiation generate said converted radiation by non-linear interaction within each of said optical resonators, said wavelength converter device being optically coupled to said optical transmission path.

31. The optical communication line according to claim 30, wherein the optical transmission path is an optical fiber length.

32. A method for altering the optical spectrum of at least one optical signal radiation at frequency $\omega_s$ comprising, interacting by non-linear interaction the optical signal radiation with an optical pump radiation at frequency $\omega_p$ in a structure comprising a plurality of cascaded optical resonators each comprising a non-linear material, resonating at the pump, signal and converted frequencies $\omega_p$, $\omega_s$ and $\omega_g$, and having an optical length of at least $40*\lambda/2$, $\lambda$ being the wavelength of the pump radiation, wherein the pump and signal radiation generate said converted radiation through said non-linear interaction within each of said plurality of cascaded optical resonators.

* * * * *